United States Patent
Court et al.

(10) Patent No.: US 7,144,952 B1
(45) Date of Patent: *Dec. 5, 2006

(54) COMPOSITIONS BASED ON SEMICRYSTALLINE THERMOPLASTIC RESINS AND BLOCK COPOLYMERS, RESULTING MATERIALS AND METHODS FOR OBTAINING SAME

(75) Inventors: Francois Court, Fontain l'Abbé (FR); Ludwik Leibler, Paris (FR); Ahmed Mourran, Ulm (DE); Christophe Navarro, Bidache (FR); Vincent Royackkers, Bernay (FR)

(73) Assignee: Arkema France, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/555,672

(22) PCT Filed: Dec. 7, 1998

(86) PCT No.: PCT/FR98/02635

§ 371 (c)(1),
(2), (4) Date: Dec. 1, 2000

(87) PCT Pub. No.: WO99/29772

PCT Pub. Date: Jun. 17, 1999

(30) Foreign Application Priority Data

Dec. 5, 1997 (FR) .................................. 97 15389

(51) Int. Cl.
*C08L 53/02* (2006.01)
(52) U.S. Cl. .......................................... 525/94; 525/98
(58) Field of Classification Search .................. 525/94, 525/99, 199, 98
See application file for complete search history.

(56) References Cited

U.S. PATENT DOCUMENTS

| | | | |
|---|---|---|---|
| 4,255,534 A | 3/1981 | Liu | |
| 5,484,838 A | 1/1996 | Helms | |
| 5,491,210 A * | 2/1996 | Onwumere et al. | ........... 528/28 |
| 6,143,826 A * | 11/2000 | Ohnaga et al. | ................ 525/93 |
| 6,762,245 B1 * | 7/2004 | Bonnet et al. | ................ 525/88 |

FOREIGN PATENT DOCUMENTS

| | | |
|---|---|---|
| EP | 86448 | 8/1983 |
| EP | 430214 | 6/1991 |
| EP | 0832929 | 4/1998 |
| WO | WO 94/12572 * | 6/1994 |

OTHER PUBLICATIONS

Mehler, Christof, Kunstsoffe, Oct. 1998 88(10), 1872, 1874, 1876.*
Auschura et al, Macromolecules, 1993, 26, 6364-6377.*
Reiss et al: "New Morphologies in rubber modified polymers" Journal of Macromolecular science part B physics vol. B17, No. 2, 1980, pp. 355-374.
Chemical Abstracts vol. 124, No. 10, Mar. 4, 1996 abstract No. 119152 &JP 07 278364.

* cited by examiner

*Primary Examiner*—Jeffrey Mullis
(74) *Attorney, Agent, or Firm*—Thomas F. Roland

(57) ABSTRACT

These compositions based on semi-crystalline thermoplastic resin and on ABC block copolymers result in materials or in items which exhibit an impact strength, an elongation at break, a resistance to cracking and to deformation under stress, and a thermal behavior which are improved with respect to semi-crystalline resin or resins alone or mixed with conventional impact additives, while retaining a high modulus and thus a degree of stiffness. They are generally suitable for the preparation of items or articles, such as sheets, films, pipe sheathings, tubings, pipes, yarns, strands, cable sheathings, bracing wires, leaktight sheathings, sleeve tubes, both mono- and multilayer, shaped components, molded panels, thermoformed articles, sections, bottles or powders for coating substrates. The materials or items obtained from these compositions exhibit a characteristic morphology visible in electron microscopy.

1 Claim, 10 Drawing Sheets

Morphology after damaging
ABC+PVC

Morphology before damaging
ABC+PVC

COMPOSITIONS BASED ON SEMICRYSTALLINE THERMOPLASTIC RESINS AND BLOCK COPOLYMERS, RESULTING MATERIALS AND METHODS FOR OBTAINING SAME

This application claims benefit, under U.S.C. § 119 or §365 of French Application Number 97/15389, filed Dec. 7, 1997, and PCT/FR98/02635 flied Dec. 7, 1998.

The present invention relates to compositions based on semi-crystalline thermoplastic polymers, to materials obtained from these compositions and to their processes of preparation. Thermoplastic resins, which are easy to process and convert, are widely used in many fields according to their specific mechanical and chemical properties.

Mention may in particular be made, among semi-crystalline thermoplastic resins, of polyamides (PA), polyolefins, fluorinated resins, vinyl resins, polyesters, polycarbonates, polyoxyalkylenes, polyurethanes or polysiloxanes.

However, as their mechanical, chemical and/or thermal properties are not always sufficient, in particular their impact strength at room temperature and/or at low temperature, as well as their elongation at break, there is often reason to add specific additives to them.

In order to improve certain properties, in particular the impact strength, it is possible to add plasticizers which lower the intermolecular interaction forces and bring about a decrease in the modulus and thus a softening of the polymer to which they are added, which is not necessarily desired in certain applications. Furthermore, these substances exhibit the well-known disadvantage of exuding more or less rapidly from the polymer material in which they are incorporated, which is thus reflected by a decrease in the impact strength and is sometimes accompanied by a shrinkage of the material.

Provision has also been made to add elastomers and/or thermoplastic elastomers (TPE) as impact additives, as disclosed in EP 239,707. The compositions thus obtained exhibit an improved impact strength with respect to the thermoplastic resin alone but it is necessary to incorporate a large amount of elastomers or of TPE in the composition in order to obtain a significant improvement in these properties, typically of the order of 20% by weight of the total mass of the composition, and this is harmful to the intrinsic properties of the semi-crystalline thermoplastic resin.

It is known in the prior art that, when conventional impact or other additives are added to a semi-crystalline thermoplastic resin, the domains composed of these additives have a tendency to come together in the resin. This phenomenon, which is harmful to the properties of the final material obtained by shaping the composition, is known as coalescence.

Another known technical solution consists in combining, by the blend route, another polymer with the thermoplastic resin, the properties of which it is desired to improve. However, it is often difficult to mix polymers of different chemical natures, given the incompatibility which can exist between the resins which it is desired to combine; this incompatibility is reflected by a macroseparation of phases which can result, if it is not controlled, in materials of coarse morphology and thus with poor mechanical properties. To overcome this problem, a so-called compatibilizing agent is added, which agent is confined to the interface between the incompatible polymers and has the role of reducing the size of the separate phases to a few micrometers by limiting the coalescence. The addition of these compatibilizing agents (or their in situ synthesis) has the effect, on the one hand, of reducing the size of the domains constituted by the second polymer dispersed in the matrix composed of the first polymer and, on the other hand, of improving the cohesion between these domains and the matrix. Compatibilizing agents (block copolymer(s)) for incompatible resins are disclosed, for example, in DE 4,416,853 and DE 4,416,855. However, for many applications, this route does not make it possible to obtain materials having the required mechanical and chemical resistance properties.

U.S. Pat. No. 5,484,838 discloses a mixture of at least two polymers chosen from a collection of polymers. The styrene-butadiene block copolymer and the methyl methacrylate-styrene-butadiene block copolymer are indicated among these polymers. For a person skilled in the art, the first copolymer is recognized as a diblock where each of the blocks appears separated by a single hyphen. Likewise, for the same reason, the second block copolymer is recognized as being a diblock where each of the blocks appears separated by a single hyphen and is composed of a block formed of methyl methacrylate and styrene monomers and of a polybutadiene block.

Patent Application JP-A-63-308055 discloses a composition based on poly(vinylidene difluoride) (PVDF) comprising a block copolymer of A-B diblock, A-B-A triblock or A-B starbranched type, according to the number of dithiocarbonate groups of the radical initiator used in the synthesis of the copolymer.

The monomer or monomers used to synthesize the block A compatible with PVDF are chosen from methyl methacrylate, methyl acrylate and vinyl acetate.

The block B preferably has a glass transition temperature Tg not exceeding 0° C. and better still not exceeding −10° C.

On the basis of these Tg values, the monomer intended to constitute the block B is chosen on the basis of the known Tg values of homopolymers with a molecular weight of at least 10,000 obtained by conventional radical polymerization. Thus, ethyl acrylate results in such a homopolymer with Tg=−24° C. The list provided contains: butyl acrylate (−54° C.), 2-ethylhexyl acrylate (−85° C.), hydroxyethyl acrylate (−15° C.) and 2-ethylhexyl methacrylate (−10° C.).

The block B can also be composed of several monomers chosen as a function of the Tg of their corresponding homopolymer and in proportions which can be calculated so as to obtain, for the block B copolymer, a Tg not greater than 0° C.

The block copolymer comprises from 5 to 75% by weight of block A with respect to the total weight and the composition preferably comprises from 5 to 30 parts of the block copolymer per 100 parts by weight of PVDF.

This composition based on PVDF (Kynar 740®) is disclosed as having improved properties with respect to those of PVDF alone, in particular as regards the flexibility, the impact strength, the stress at break and the elongation at break.

However, this composition of the prior art exhibits disadvantages. First of all, the dithiocarbonate radical initiator comprises sulphur and the said composition has a tendency to turn yellow. Furthermore, Examples 1 to 5 show that, in the synthesis of the block copolymers, formation of homopolymer(s) takes place to contents of 13 to 18%. These homopolymers can be extracted from the diblock with acetone. Finally, when the block B is incompatible with the PVDF, as it is elastomeric in nature, it constitutes discontinuous soft domains. These soft domains have the effect of rendering the composition softer than PVDF alone. In other words, the limiting or maximum temperature of use of the composition, characterized by the Vicat temperature, is reduced and this constitutes a significant disadvantage.

Patent JP-B-46-7457 discloses a composition based on poly(vinyl chloride) (PVC) comprising a block copolymer of A-B diblock type.

The A-B diblock is obtained by living anionic polymerization of the B block and then of the A block.

The monomer used to synthesize the elastomeric B block is a diene chosen from butadiene, isoprene, 2,3-dimethyl-1,3-butadiene, 1,3-pentadiene or 2-phenyl-1,3-butadiene.

The monomer used to synthesize the A block from the living B polymer is methyl methacrylate (MMA).

The A-B diblock copolymer is thus poly(MMA)-poly(diene) and comprises from 20 to 80% by weight of poly(MMA) and from 80 to 20% by weight of poly(diene).

It is indicated that the poly(MMA)-poly(diene) diblock copolymer comprises a small amount of polydiene homopolymer and that it is possible to remove this homopolymer by extraction with a solvent, such as petroleum ether or cyclohexane.

The material obtained from the PVC composition comprising this poly(MMA)-poly(diene) diblock is disclosed as having better properties than a material obtained from a PVC composition mixed with an elastomer consisting of a statistical copolymer.

The impact strength, the stress at break and the transparency are selectively increased. On the other hand, the hardness (Rockwell R) of the various materials in Table 1 is lower than that of unmodifed PVC and the higher the content of diblock copolymer, the more the hardness of the material decreases.

Table 1 also shows a decrease in transparency and an increase in the haze with the increase in the content of diblock copolymer.

This situation is a hindrance to the uses of the material obtained from the PVC+poly(MMA)-poly(diene) mixture because the aim is to improve the impact strength without decreasing the hardness or without reducing the temperature range of use of the material. This temperature range is characterized by the Vicat temperature or Vicat point.

The first aim of the present invention is to provide compositions comprising:
  a semi-crystalline thermoplastic resin $X_1$ or several compatible thermoplastic resins $X_1$ to $X_n$, at least one $X_1$ of which is semi-crystalline, and
  at least one block (sequential) copolymer,
  n being an integer equal to or greater than 1, resulting; by shaping, in materials or in items having good hardness and exhibiting an impact strength, an elongation at break, a resistance to cracking, a resistance to deformation under stress and a thermal behaviour (temperature range of use) which are improved with respect to the semi-crystalline resin or resins, alone or mixed with known additives, of the prior art.

The above problem arises in particular with halogenated thermoplastic polymers or copolymers, in particular PVDF, PVC or chlorinated PVC (CPVC).

Furthermore, the Applicant Company has found that PVDF- or PVC-based compositions reported above comprising blocks of A-B or A-B-A diblock, or A-B star-branched type exhibit a major disadvantage since they comprise homopolymers of A or B type as by-products of the synthesis of these blocks: the presence of the homopolymers is particularly harmful to the mechanical properties of the material, in particular as regards their hardness at the Vicat point and especially their tensile behaviour.

The abovementioned documents have possibly provided for a purification of the block copolymers at the end of their synthesis by selective extraction using solvent (acetone, petroleum ether or cyclohexane) This extraction is a purification stage which is both expensive and tedious and which is particularly disadvantageous to operate industrially, from the teachings of the above two Japanese documents.

Thus, a second aim of the present invention is to find a technical solution to the problem set out above which does not require selective extraction by solvents and which consequently greatly simplifies the industrial feasibility.

The first aim is achieved by a composition intended to be formed into a material or an item which comprises:
  a semi-crystalline thermoplastic resin $X_1$ or several compatible thermoplastic resins $X_1$ to $X_n$, at least one $X_1$ of which is semi-crystalline, and
  at least one block (sequential) copolymer,
  n being an integer equal to or greater than 1, characterized in that:
  the block copolymer comprises at least three blocks A, B and C connected to one another in this order, each block being either a homopolymer or a copolymer obtained from two or more monomers, the A block being connected to the B block and the B block to the C block by means of a covalent bond or of an intermediate molecule connected to one of these blocks via a covalent bond and to the other block via another covalent bond, and in that:
    the A block is compatible with the thermoplastic resin or resins $X_1$ to $X_n$,
    the B block is incompatible with the thermoplastic resin or resins $X_1$ to $X_n$ and incompatible with the A block,
    the C block is incompatible with the thermoplastic resin or resins $X_1$ to $X_n$, the A block and the B block.

The B block generally has a glass transition temperature $Tg_{(B)}$ of less than 23° C.

The $Tg_{(B)}$ of the B block is advantageously less than 0° C.

The $Tg_{(B)}$ of the B block is preferably less than −50° C.

The choice of the temperature $Tg_{(B)}$ depends on the temperature Ta which can be adopted by the material or item obtained from the composition according to the invention during use. This is because, at this temperature Ta, it is preferable for the B block to be elastomeric and not in the vitreous state.

The C block preferably has a glass transition temperature $Tg_{(C)}$ or a melting temperature $M.t._{(C)}$ which is greater than the $Tg_{(B)}$ of the B block.

This characteristic confers the possibility of the C block being in the vitreous state or in a partially crystalline state and the B block in the elastomeric state, for the same temperature of use Ta.

According to the present invention, it is possible to choose the nature of the B blocks in order to have a certain specific $Tg_{(B)}$ and thus, at the temperature of use. Ta of the material or of the item formed from the composition, to have an elastomeric or flexible state of these B block polymers. On the other hand, it being possible for the C block polymers to have a $Tg_{(C)}$ or an M.t. which is greater than the $Tg_{(B)}$, they can be in a relatively stiff vitreous state at the same temperature of use.

As the C blocks are incompatible with the thermoplastic resin or resins, the A blocks and the B blocks, they form a rigid discontinuous phase within the material, forming nanodomains included in the material which act as anchorages in the domain of one of the ends of each B block. The other end of each B block is connected to an A block which has a high affinity with the semi-crystalline thermoplastic resin or resins. This high affinity provides a second anchorage in the domain of the second end of the B block.

The compatibility of the A blocks and the incompatibilities stated above of the B and C blocks, with the choice of the $Tg_{(B)}$ and of the $Tg_{(C)}$ or of the $M.t._{(C)}$ of the composition according to the invention, allow a greater effectiveness of the elastomeric or soft B blocks on the impact strength properties of the material, while allowing the hardness of the material to be retained or even improved. The Vicat temperature of the material formed from the composition is found to be retained or increased with respect to the material formed from the semi-crystalline thermoplastic resin or else from the mixture of semi-crystalline thermoplastic resins.

The A block of an ABC copolymer is regarded as compatible with the semi-crystalline thermoplastic resin if the A polymer identical to this block (thus without B and C sequences) is compatible with this resin in the molten state. Likewise, the A and B blocks are regarded as compatible if the A and B polymers identical to these blocks are compatible. Generally, compatibility between two polymers is understood to mean the ability of one to dissolve in the other in the molten state or else their complete miscibility.

In the contrary case, the polymers or blocks are said to be incompatible.

The lower the enthalpy of mixing of two polymers, the greater their compatibility. In certain cases, there is a specific favourable interaction between the monomers which is reflected by a negative enthalpy of mixing for the corresponding polymers. In the context of the present invention, it is preferred to employ compatible polymers for which the enthalpy of mixing is negative or zero.

However, the enthalpy of mixing cannot be conventionally measured for all polymers and thus the compatibility can only, be determined indirectly, for example by torsional or oscillatory viscoelastic analysis measurements or by differential calorimetric analysis.

For compatible polymers, 2 Tg values can be detected for the mixture: at least one of the two Tg values is different from the Tg values of the pure compounds and lies within the range of temperatures between the two Tg values of the pure compounds. The mixture of two completely miscible polymers exhibits a single Tg.

other experimental methods can be used to demonstrate the compatibility of polymers, such as haze measurements, light scattering measurements or infrared measurements (L. A. Utracki, Polymer Alloys and Blends, pp. 64–117).

Miscible or compatible polymers are listed in the literature, see, for example, J. Brandrup and E. H. Immergut: Polymer Handbook, 3rd Edition, Wiley & Sons 1979, New York 1989, pp. VI/348 to VI/364; O. Olabisi, L. M. Robeson and M. T. Shaw: Polymer Miscibility, Academic Press, New York 1979, pp. 215–276; L. A. Utracki: Polymer Alloys and Blends, Hanser Verlag, Munich, 1989. The lists which appear in these references are given by way of illustration and are not, of course, exhaustive.

In the same way as for the diblocks of the prior art, the synthesis of the triblocks results in mixtures because they comprise small amounts of diblocks and of monoblocks (homopolymers). The Applicant Company has found, surprisingly, that, in the case of the triblocks, these side products were not harmful to the mechanical properties of the composition according to the present invention, unlike the compositions of the prior art based on diblock and on PVDF or on PVC. For the latter known compositions, the presence of these homopolymers is particularly harmful to the properties of the material and therefore necessarily requires an expensive purification.

Thus, the composition according to the invention comprising a copolymer with at least three A, B and C blocks can comprise, as side products of its synthesis, a B-C diblock copolymer and optionally C homopolymer.

Likewise, the composition according to the invention comprising a copolymer with at least three A, B and C blocks can comprise, as side products of its synthesis, an A-B diblock copolymer and optionally A homopolymer.

This is because the synthesis of a copolymer with at least three A, B and C blocks is preferably carried out by successively joining the A block to the B block and then to the C block or, conversely, the C block to the B block and then to the A block, depending on the nature of the three A, B and C blocks, the A block being, by definition, that which is compatible with the compatible thermoplastic resin or resins $X_1$ to $X_n$.

The B block is advantageously chosen from poly(dienes), in particular poly(butadiene), poly(isoprene) and their statistical copolymers, or alternatively from poly(dienes), in particular poly(butadiene), poly(isoprene) and their statistical copolymers which are partially or completely hydrogenated.

The block copolymer comprising at least three A, B and C blocks is such that the A block is connected to the B block and the B block to the C block by means of one or more simple covalent bonds. In the case of several covalent bonds between the A block and the B block and/or between the B block and the C block, it is possible to have there a single unit or a linkage of units serving to join the blocks to one another. In the case of a single unit, the latter can originate from a monomer, known as a moderator, used in the synthesis of the triblock. In the case of a linkage of units, this linkage can be an oligomer resulting from a linkage of monomer units of at least two different monomers in an alternating or statistical order. Such an oligomer can connect the A block to the B block and the same oligomer or a different oligomer can connect the B block to the C block.

The composition according to the invention is advantageously characterized in that it comprises:
from 25 to 95%, advantageously from at least 50% and preferably from 65 to 95% by weight of the thermoplastic resin or resins $X_1$ to $X_n$,
the remainder (to 100%) by weight of the copolymer comprising the three A, B and C blocks connected to one another, these percentages being calculated with respect to the total weight of thermoplastic resin(s) with the block copolymer, and in that the block copolymer comprises:
20 to 93 parts by weight of A sequences
5 to 68 parts by weight of B sequences
2 to 65 parts by weight of C sequences.

When the above composition comprises several block copolymers, each comprising the three A, B and C blocks, the amounts indicated above as parts by weight correspond to the sum of all the sequences of A, B and C type respectively.

A great many compositions can advantageously be obtained according to the present invention. A non-exhaustive list is indicated below:
a) a composition which comprises, by weight:
at least 50% and preferably from 65 to 95% of poly (carbonate), and
the remainder to 100% of the PMMA-PB-PS triblock copolymer,
these percentages being calculated with respect to the total weight of thermoplastic resin(s) and of the block copolymer.

b) a composition which comprises, by weight:
   at least 50% and preferably from 65 to 95% of poly(carbonate) PC, and
   the remainder to 100% of the poly(cyclohexyl methacrylate)-PB-PS triblock copolymer,
   these percentages being calculated with respect to the total weight of thermoplastic resin(s) and of the block copolymer.
c) a composition which comprises, by weight:
   at least 50% and preferably from 65 to 95% of poly(butylene terephthalate) PBT, and
   the remainder to 100% of the PMMA-PB-PS triblock copolymer,
   these percentages being calculated with respect to the total weight of thermoplastic resin(s) and of the block copolymer.
d) a composition which comprises, by weight:
   at least 50% and preferably from 65 to 95% of poly(oxyethylene) POE, and
   the remainder to 100% of the PMMA-PB-PS triblock copolymer,
   these percentages being calculated with respect to the total weight of thermoplastic resin(s) and of the block copolymer.
e) a composition which comprises, by weight:
   at least 50% and preferably from 65 to 95% of poly(propylene) PP, and
   the remainder to 100% of the poly(nonyl methacrylate)-PB-PS triblock copolymer,
   these percentages being calculated with respect to the total weight of thermoplastic resin(s) and of the block copolymer.
f) a composition which comprises, by weight:
   at least 50% and preferably from 65 to 95% of poly(amide) PA,
   the remainder to 100% of the poly(caprolactone)-PB-PS triblock copolymer,
   these percentages being calculated with respect to the total weight of thermoplastic resin(s) and of the block copolymer.

In the case of a fluorinated resin or of several compatible fluorinated resins, preferably, the composition according to the invention is characterized in that it comprises, by weight, at least 50% and preferably from 65 to 95% of semi-crystalline thermoplastic fluorinated resin(s) and the remainder (to 100%) by weight of at least one block copolymer with a number-average molecular mass ($M_n$) of greater than or equal to 20,000 g.mol$^{-1}$, preferably of between 50,000 and 200,000 g.mol$^{-1}$, composed of:
   20 to 93 and advantageously of 30 to 60 parts by weight of A sequences,
   5 to 50 and advantageously of 10 to 40 parts by weight of B sequences,
   2 to 50 and advantageously of 5 to 40 parts by weight of C sequences, the percentages being calculated with respect to the total weight of fluorinated resin(s) with the block copolymer.

The composition preferably comprises poly(vinylidene difluoride) (PVDF) as thermoplastic fluorinated resin and a poly(methyl methacrylate)-poly(butadiene)-poly(styrene) PMMA-PB-PS triblock copolymer.

The compositions according to the invention comprising at least 50% and preferably from 65 to 95% of semi-crystalline thermoplastic fluorinated resin(s) exhibit an impact strength, an elongation at break and an increase in the yield point (resistance to deformation under stress, absence of necking and of whitening during traction) which are improved, while retaining a high modulus and thus a degree of rigidity, and exhibit a semi-crystalline nature.

These compositions can be used for the preparation of materials subjected to stresses under high- and/or low-temperature conditions, in contact with particularly aggressive substances (such as hydrocarbons, strong acids, solvents, inorganic and organic bases), during which their properties of resilience are particularly required. The preferred compositions are those which comprise at least 10% of ABC triblock copolymer(s) (with respect to the fluorinated resin(s)+ABC triblock(s) total mass).

The compositions according to the invention as defined above based on fluorinated resin are particularly suited to the manufacture of leaktight sheathings for flexible metal pipes for the extraction and/or transportation of gas and hydrocarbons in the oil and gas industries. These leaktight sheathings are generally provided in the form of single-layer or multi-layer pipes manufactured by extrusion or coextrusion, into which the flexible metal pipe is subsequently inserted, or else formed directly on the flexible pipe.

In the case of a vinyl resin or of several compatible vinyl resins, preferably, the composition according to the invention is characterized in that it comprises, by weight, at least 50% and preferably from 65 to 95% of semi-crystalline thermoplastic vinyl resin(s) and the remainder (to 100%) by weight of at least one block copolymer with an $M_n$ of greater than or equal to 20,000 g.mol$^{-1}$, preferably of between 50,000 and 200,000 g.mol$^{-1}$, composed of:
   20 to 93 and advantageously of 30 to 60 parts by weight of A sequences,
   5 to 68 and advantageously of 11 to 55 parts by weight of B sequences,
   2 to 50 and advantageously of 5 to 49 parts by weight of C sequences, the percentages being calculated with respect to the total weight of vinyl resin(s) with the block copolymer.

The composition preferably comprises poly(vinyl chloride) (PVC) as semi-crystalline thermoplastic vinyl resin and a poly(methyl methacrylate)-poly(butadiene) poly(styrene) triblock copolymer.

The composition advantageously comprises chlorinated poly(vinyl chloride) (CPVC) as semi-crystalline thermoplastic vinyl resin and a poly(methyl methacrylate)-poly(butadiene)-poly(styrene) triblock copolymer.

The compositions comprising at least 50% by weight of semi-crystalline thermoplastic vinyl resin(s), preferably from 60 to 95%, exhibit an impact strength and a Vicat temperature which are improved with respect to PVC resins alone or mixed with conventional impact additives.

These vinyl compositions can, for example, be used for the preparation of window or pipe sections, switch cases and boxes, films, panels or bottles of mono- and multilayer type.

In the case of a styrene resin or of several compatible styrene resins, preferably, the composition according to the invention is characterized in that it comprises, by weight, at least 50% and preferably from 65 to 95% of semi-crystalline styrene thermoplastic resin(s) and the remainder (to 100%) by weight of at least one block copolymer with an $M_n$ of greater than or equal to 20,000 g.mol$^{-1}$, preferably of between 50,000 and 200,000 g.mol$^{-1}$, composed of:
   20 to 93 and advantageously of 30 to 60 parts by weight of A sequences,
   5 to 50 and advantageously of 10 to 40 parts by weight of B sequences, 2 to 50 and advantageously of 5 to 49 parts by weight of C sequences, the percentages being calculated with respect to the total weight of styrene resin(s) with the block copolymer.

The composition preferably comprises poly(styrene) as semi-crystalline thermoplastic styrene resin and a poly(styrene)-poly(butadiene)-poly(methyl methacrylate) triblock copolymer.

The semi-crystalline thermoplastic styrene resin is generally syndiotactic.

The composition according to the invention can also comprise one or more thermoplastic polymer(s) D compatible with the C sequences, D being present in an amount of less than 10% of the total mass of thermoplastic resin(s) $X_1$ to $X_n$ and of the block copolymer(s) with, possibly, its side products.

The D polymers can be either homopolymers or statistical copolymers. Mention may be made as D polymer, for triblocks having C sequences deriving from styrene, of poly(phenylene ether), poly(vinyl ether) and poly(methylphenylsiloxane).

A process for the preparation of a material or of an item from the composition according to the invention is advantageously characterized in that it comprises the following stages:
- the thermoplastic resin(s) $X_1$ to $X_n$ is (are) mixed in the molten state with the block copolymer(s) and optionally the thermoplastic polymer(s) D, optionally in the presence of additives and/or of fillers which can remain in a solid state,
- the liquid or the molten material (optionally with the suspended fillers) thus obtained is cooled to give a material or an item in the solid state.

This process, which consists in mixing the molten resin(s) with the molten copolymer(s), is distinguished by its simplicity of implementation. It results, by cooling, in a material having a characteristic structure.

The compositions according to the invention result in materials or items generally exhibiting an extremely fine and regular specific morphology which can be obtained by the process comprising a simple mixing in the molten state of the constituents and does not require severe mixing or dispersing techniques. Furthermore, this morphology is retained in the items formed, in particular by injection or extrusion of the material (for example as granules), which are subjected to a new cycle of melting, followed by cooling.

The material or item having a composition according to the invention can be characterized by the following specific heterogeneous structure:
- the structure is formed of a continuous phase (matrix) formed essentially of the thermoplastic resin or resins $X_1$ to $X_n$ comprising a discontinuous phase dispersed in a very even manner as nodules with a size $D_n$ of less than 0.5 micrometer,
- each nodule comprises an internal region composed mainly or essentially of C blocks and an external peripheral region comprising the B blocks of the copolymers with at least three A, B and C blocks connected to one another in this order, this peripheral region surrounding the internal region in a continuous or discontinuous fashion.

The industrial implementation of the compositions advantageously makes use of the triblocks with their side products of their synthesis. In this case, the morphology changes slightly and a material or item is obtained which is characterized in that the copolymer with at least three A, B and C blocks comprises, as side products of its synthesis, a B-C diblock copolymer and optionally C homopolymer and that the heterogeneous structure specific to this composition is modified in that the internal region of the nodules, composed mainly or essentially of C blocks, surrounds one or more domains composed essentially of B blocks of the B-C diblock.

The relative proportions by mass of semi-crystalline thermoplastic resins and of triblocks are advantageously chosen so that the nodules have a size $D_n$ ranging from 30 to 350 nanometers.

The choice is preferably made in order for the nodules to have a size $D_n$ ranging from 60 to 250 nanometers.

Generally, the material or item is also characterized in that the distance between two neighbouring nodules $D_i$ is between 1.1 and 5 times the value of the size $D_n$. It is found that this distance $D_i$ is substantially constant and this indicates a very homogeneous distribution of the nodules in the material.

This very homogeneous distribution is one of the major advantages of the invention because it is possible to introduce the block copolymer as defined in claim 1 to a very high level by weight, without observing coalescence harmful to the properties of the material or of the item.

Mention may in particular be made, among semi-crystalline thermoplastic resins, of
- fluorinated resins known for their good thermal behaviour, their chemical resistance, in particular to solvents, resistance to bad weather and to radiation (UV, and the like), their impermeability to gases and to liquids, and their electrical insulating property.

Mention will very particularly be made of vinylidene fluoride (VF2) homo- and copolymers preferably-comprising at least 50% by weight of VF2 and at least one other fluorinated monomer, such as chlorotrifluoroethylene (CTFE), hexafluoropropylene (HFP), trifluoroethylene (VF3) or tetrafluoroethylene (TFE),
- trifluoroethylene (VF3) homo- and copolymers,
- copolymers, in particular terpolymers, combining the residues of chlorotrifluoroethylene (CTFE), tetrafluoroethylene (TFE), hexafluoropropylene (HFP) and/or ethylene units and optionally of VF2 and/or VF3 units.
- polyamide or PA resins which comprise aliphatic and/or cycloaliphatic and/or aromatic units.

Mention may be made of the resins obtained by polycondensation of one or more lactams or of α, ω-amino acids or by a substantially stoichiometric polycondensation of one or more aliphatic diamine(s) and of one or more aliphatic dicarboxylic acid(s).

The preferred lactams are caprolactam, decalactam, undecalactam and dodecalactam.

The preferred α,ω-amino acids are 6-aminohexanoic acid, 10-aminodecanoic acid, 11-aminoundecanoic acid and 12-aminododecanoic acid. The carbon-comprising chain of the aliphatic α,ω-diamines can be linear (polymethylenediamine) or branched and preferably comprises up to 12 carbon atoms. Preferred diamines are hexamethylenediamine (HMDA) and dodecamethylenediamine.

The carbon-comprising chain of the aliphatic α,ω-dicarboxylic acids can be linear or branched. The preferred diacids are adipic acid, azelaic acid, sebacic acid and 1,12-dodecanedoic acid.

Mention may be made, by way of illustration of such PA resins, of:
- polyhexamethyleneadipamide (PA-6, 6),
- polyhexamethylenesebacamide (PA-6, 10),
- polyhexamethylenedodecanediamide (PA-6, 12), poly(undecanoamide) (PA-11),
polylauryllactam (PA-12),
polydodecamethylenedodecanediamide (PA-12, 12),
the copolymers of the above.

The PAs have a number-average molecular mass $M_n$ generally greater than or equal to 5000 g.mol$^{-1}$. Their inherent viscosity (measured at 20° C. for a 0.5 g sample in 100 g of meta-cresol) is generally greater than 0.7.

polyolefins and in particular polyethylene (PE), polypropylene (PP), polyisoprenes, poly-1-butene or copolymers of olefins, such as PP/PE or PP/polyisoprene;

vinyl resins having a certain degree of crystallinity and in particular poly(vinyl chloride) (PVC) with syndiotactic segments, chlorinated PVC (CPVC) and vinylidene chloride (PVDC), or syndiotactic PS, which are optionally copolymerized;

polyesters and in particular poly(ethylene terephthalate) (PET) or poly(butylene terephthalate) (PBT);

polycarbonates (PC), among which may be mentioned poly(oxycarbonyloxy-1,4-phenyleneisopropylidene-1, 4-phenylene), poly(oxycarbonyloxy-1,4-phenylenemethylene-1,4-phenylene) or poly(oxycarbonyloxy-1, 4-phenylenethio-1,4-phenylene);

polyoxyalkylenes and in particular polyoxymethylenes (POM), polyoxyethylenes (POE) and polyoxypropylenes (POP);

aliphatic polyketones and in particular alternating (ethylene-ketone) copolymers and terpolymers (ethylene-ketone-propylene).

Mention will very particularly be made, by way of example of A sequences which are compatible with VF2 homo- and copolymers, PVC, CPVC, POE and PCs, of those which are derived from alkyl(alkyl)acrylate, for example from methyl methacrylate (MAM) and/or from methyl acrylate, and/or those deriving from vinyl acetate. PMMA sequences, preferably syndiotactic PMMA sequences, are advantageously preferred. Mention may also be made of statistical copolymers of butadiene and of acrylonitrile comprising from 23 to 45% of acrylonitrile, statistical copolymers of ethylene and of vinyl acetate comprising from 65 to 75% of vinyl acetate and statistical copolymers of styrene and of acrylonitrile comprising 28% of acrylonitrile which are compatible with PVC.

Mention will very particularly be made, by way of example of A sequences which are compatible with PA resins, of those which are derived from caprolactone and/or from glycidyl methacrylate and/or from (meth)acrylic acid. Mention may also be made of statistical copolymers of p-(2 hydroxyhexafluoroisopropyl)styrene and of styrene which are compatible with PA-6 and PA-12.

Mention will be made, by way of example of A sequences which are compatible with polypropylene, of those which are derived from nonyl methacrylate.

Mention will be made, by way of example of A sequences which are compatible with polyesters and polyoxymethylenes, of those which are derived from alkyl(meth)acrylate(s).

Mention will be made, by way of example of A sequences which are compatible with polycarbonates, of those which are derived from methyl methacrylate.

Mention may be made, among the B sequences, of polymers obtained from alkyl acrylates, such as, for example, butyl acrylate or 2-ethylhexyl acrylate and preferably dienes, such as butadiene or isoprene, which are optionally partially or completely hydrogenated, and particularly advantageously those with the lowest Tg, for example poly(1,4-butadiene) with a Tg (approximately −90° C.) which is less than that of poly(1,2-butadiene) (approximately 0° C.).

Mention may be made, among the C blocks or sequences of the ABC triblock copolymers, of the sequences which are derived from vinylaromatic compounds, such as styrene, α-methylstyrene or vinyltoluene, and those which are derived from alkyl esters of acrylic acid and/or methacrylic acid having from 1 to 18 carbon atoms in the alkyl chain.

The triblocks which comprise sequences deriving from alkyl(alkyl)acrylate can be prepared in particular by anionic polymerization, for example according to the processes disclosed in Patent Applications EP 524,054 and EP 749, 987.

The compositions according to the invention can also comprise various macromolecular or otherwise, organic or inorganic, additives and/or fillers and/or dyes and/or pigments well known in the literature.

Mention may be made, by way of non-limiting examples of fillers which are insoluble in these compositions, of mica, alumina, talc, titanium dioxide, carbon black, glass fibres, carbon fibres or fibres of macromolecular compounds.

Mention may be made, by way of non-limiting examples of additives, of anti-U.V. agents, flame-retardant agents, conversion agents or processing aids.

The sum of these various additives and fillers generally represents less than 20% of the thermoplastic resin(s)+ triblock(s) total mass.

By way of example, in the multi-layer leaktight sheathings disclosed in U.S. Pat. No. 5,601,893, the polymer can advantageously be replaced by a fluorinated composition according to the present invention.

These compositions are also well suited to the preparation of chemical engineering components, in particular in the form of tubes or pipes, and to the preparation of items in the field of the building and public works industries, such as cable sheathings or bracing wires, and of mono- or multilayer films and sheets for any type of industry. The compositions can be subjected to shaping by extrusion blow-moulding in order to result in films.

Mention will be made, by way of example of sheathings, yarns, strands, cables and bracing wires, of those disclosed in Patent Applications EP 671,502 and EP 671,746, where the polymer can be replaced by a composition according to the present invention.

As the fluorinated compositions exhibit properties of resistance to deformation under stress and in particular a decrease of, indeed in some cases the suppression of, the fall in modulus beyond the yield point, this allows them to be used in the preparation of articles and of materials requiring a deformation under stress during their positioning; this is typically the case in the renovation of conduits in distribution networks for natural gas, where plastic pipes are jacketed and can thus be inserted into existing conduits, which are generally metallic.

The compositions according to the invention based on PA resin can advantageously be used in the preparation of articles for the automobile, building, sports and leisure industries (pipework, pipes, bumpers, body parts, engineering parts, moulded panels, thermoformed articles, powders for the coating of substrates, and the like).

In addition to the above description, the following experimental part with the appended photographs will allow a better understanding of the present invention. The examples are given purely by way of illustration without wishing to limit the invention.

Experimental Part

The photographs are taken by electron microscopy with a technique for the selective labelling of the double bonds present in the polymers. In these photographs, the character μ means micrometer (μm).

These photographs appear in the following figures:

Figure 1:
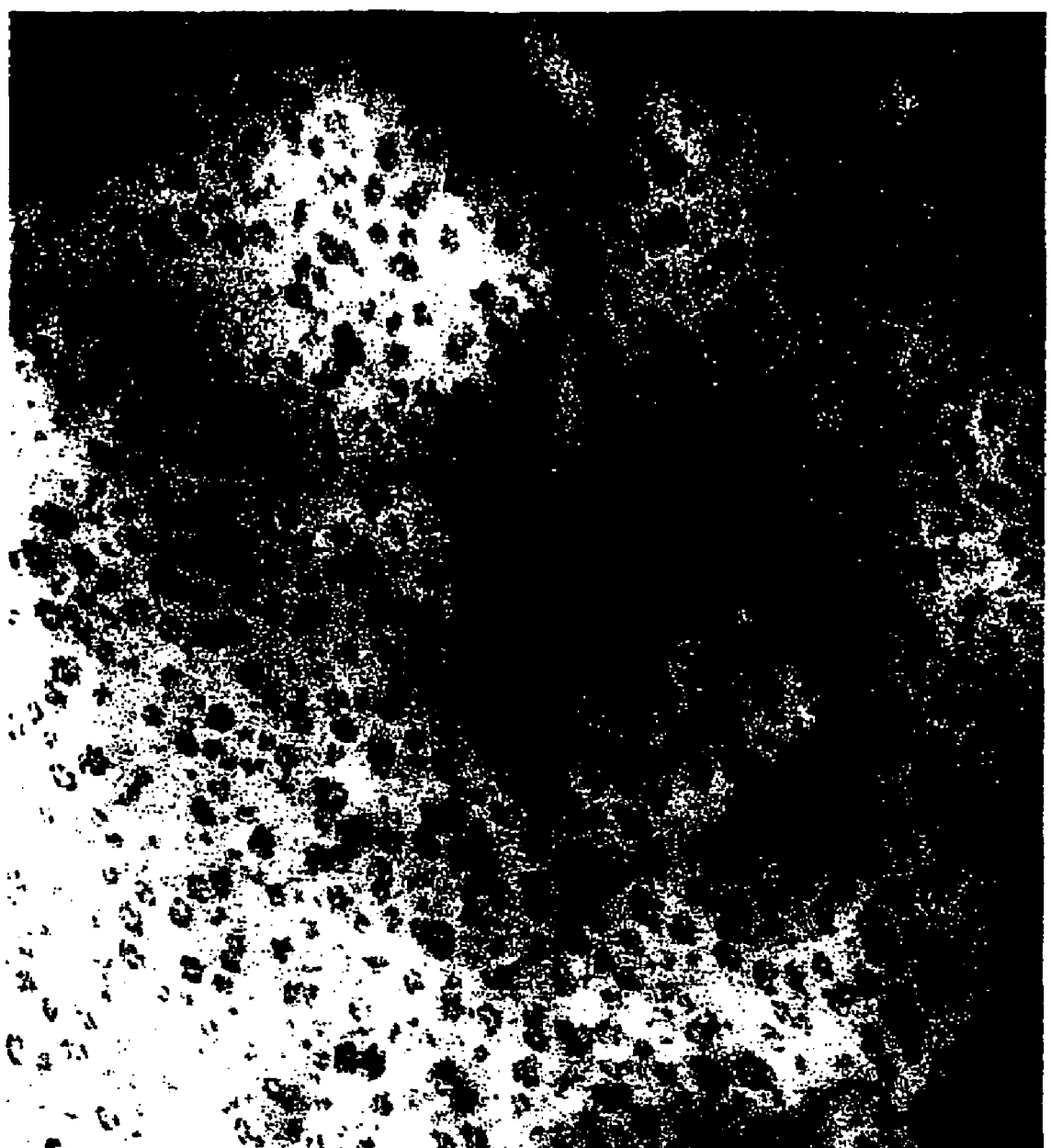
FIG. 1: Morphology of the material obtained in Example 1

Protocol for Studying the Materials by Electron Microscopy

A small sample of a material or of an item which has been shaped from a composition according to the invention or from a composition not forming part of the invention (by way of comparison) is removed.

A section with a thickness of between 40 and 60 nanometers is cut from this sample using an ultramicrotome. Depending on the stiffness of the sample and in order to obtain a quality section, it may prove necessary to cool the sample to be cut to −100° C.

In the case where the B blocks originate from the polymerization of dienes, such as, for example, butadiene or isoprene, the monomer units of these B blocks comprise double bonds which react with osmium tetroxide ($OsO_4$).

The section obtained is exposed for 15 to 30 minutes to $OsO_4$ vapour. This exposure makes it possible to selectively label the site of the nanodomains composed of poly(diene). The section thus treated is observed using a transmission electron microscope. The nanodomains composed of B blocks appear as dark on a light background.

In the case where the C blocks comprise phenyl radicals, in particular for the poly(styrenes), the corresponding nanodomains appear as light grey with respect to the lighter background, which corresponds to domains which are inert to $OsO_4$.

Other techniques for the selective labelling of various polymers for the purpose of examination by electron microscopy are known in the literature. Thus, reference may be made to the various methods described on page 108 in the work Polymer Microscopy (L. C. Sawyer and D. T. Grubb, published by Chapman and Hall, London and New York, 1987).

In the case where the B blocks are formed of a completely hydrogenated poly(diene), the blocks can no longer be visualized by $OsO_4$. On the other hand, the phenyl groups of the poly(styrene) which, in some cases, forms the C blocks or the A blocks can be labelled using ruthenium tetroxide.

Thus, according to the labelling techniques used, the three types of domains corresponding respectively to the matrix plus the compatible A blocks, to the B blocks and to the C blocks can appear in electron microscopy with different contrasts.

Thus, for example in order to visualize a multiphase structure comprising a polyamide and a polyolefin, use can be made of a selective labelling of the polyamides using phosphotungstic acid.

The commercial products (Elf Atochem) sold under the trade name Kynar® are homopolymers or copolymers based on PVDF:

Kynar® 400 is available in powder form; its melting temperature is 170° C.

Kynar® 710 is a homopolymer available in the form of granules; its melting temperature is 170° C. and its viscosity, measured with a capillary rheometer at 230° C. and 100 $s^{-1}$, is 600–750 Pa·s.

Kynar® 720 is a homopolymer
  M.t. 170° C.
  V=750–1050 Pa·s under the same conditions as above.

Kynar® 740 is homopolymer
  M.t. =170° C.
  V=1750–2150 Pa·s, measured as above.

A triblock denoted by PMMA-PB-PS corresponds to a poly(methyl methacrylate-b-butadiene-b-styrene) triblock terpolymer.

EXAMPLE 1

A PMMA-PB-PS (50/15/35) ABC triblock for which the $M_n$ of the PMMA sequences is 50,000 g.$mol^{-1}$, that of the PB sequences is 15,000 and that of the PS blocks is 35,000 is prepared according to the procedure disclosed in EP 524,054 or in EP 749,987.

The crude triblock resulting from the anionic synthesis is purified by means of a solid-liquid extraction using cyclohexane as selective solvent for the poly(styrene)-poly(butadiene) diblock, the triblock being virtually insoluble under the reflux conditions of cyclohexane.

A specific amount of the crude triblock is weighed and then placed in a Soxhlet-type extraction cartridge. The extraction is then begun conventionally. At the end of the extraction, the purified triblock is contained in the cartridge and the poly(styrene)-poly(butadiene) diblock in cyclohexane. The diblock is recovered by evaporation of the cyclohexane.

As regards the purified triblock, the glass transition temperature of the PB sequences, mainly of 1,4 structure, is equal to −90° C. The predominantly syndiotactic (>70%) PMMA blocks have a Tg of 130° C.

30 parts by weight of this purified ABC triblock are subsequently mixed for 4 min at 215° C. in a Brabender mixer with 70 parts by weight of PVDF homopolymer sold under the trade name Kynar 710 with a melt flow index (MFI) of 20 $cm^3$/10 min, measured according to ISO Standard 1133 at 23° C. under a load of 5 kg. The mixture obtained is calendered and then pressed at 200° C. to give a material in the form of plates with a thickness of 1 mm.

The tensile strength (elongation at break), the stiffness, the appearance and the properties of elongation at break are evaluated under the conditions indicated below:

♦ Tensile Strength (Elongation at Break)

The elongation at break ($\epsilon_b$) the material and that of Kynar® 710 alone and of the triblock alone are measured according to ISO Standard R 527. At room temperature, the elongation at break $\epsilon_b$ of the composition is equal to 400–450%, whereas the elongation at break $\epsilon_b$ of Kynar® 710 alone, measured under the same operating conditions, is equal to 130% and that of the triblock alone equal to 6%. Whitening is not observed on passing the yield point of the composition, which is not damaged: no cavity is formed, the deformed region is transparent.

♦ Stiffness, Thermal Behaviour

The elastic modulus of the mixture (1500 MPa) is greater than that of Kynar® 710 (1200 MPa) from room temperature to 60° C.; on the other hand, beyond 60° C., PVDF alone, with an elastic modulus of 200 MPa, is stiffer than the mixture according to the invention, the elastic modulus of which is 150 MPa.

♦ Visual Appearance

The plates of PVDF+triblock mixture are transparent, whereas plates made of Kynar 710 with the same thickness are hazy.

♦ Examination of the Morphology of the Material (see FIG. 1)

A section with a thickness of between 40 and 60 nanometers (nm) is cut from a sample of the material using an ultramicrotome. This section is exposed for 15 to 30 min to osmium tetroxide vapour and the section thus treated is subsequently observed using a transmission electron microscope at a magnification of 30,000. The photograph of the image observed is presented in FIG. 1: the dark-coloured domains with a size of less than 0.02 µm are composed of B blocks incompatible with the light-coloured matrix composed of the PVDF+PMMA blocks mixture. The dark B domains surround, in a discontinuous fashion, lighter microdomains composed of PS blocks, the size of which is between 0.05 and 0.07 µm. It is found that the dispersion of these multiphase PB and PS nodules within the matrix is very fine and very homogeneous.

♦ Resistance to Folding

The resistance to folding of the material obtained is evaluated by manually folding a test specimen of ISO 1/2 type with a thickness of 2 mm perpendicularly to its thickness. It is found that the test specimen does not whiten at the fold, which is not the case for a test specimen with the same dimensions made of Kynar 710.

♦ Chemical Behaviour

The ABC triblock is soluble at 23° C. in toluene, whereas the composition prepared above and placed for 40 days at 23° C. in toluene only exhibits a slight swelling (increase of 2% in mass).

EXAMPLE 2

The PMMA —PB PS (50/15/35) ABC triblock of Example 1 is mixed with a PVDF homopolymer sold under the trade name Kynar® 720 (MFI=10 cm³/10 min, measured according to ISO Standard 1133 at 230° C. under a load of 5 kg) in the following ratios by mass:
Test 1: Triblock/Kynar® 720 (07/93) mixture
Test 2: Triblock/Kynar® 720 (15/85) mixture.
Test 3: Triblock/Kynar 720 (22/78) mixture
Test 4: Triblock/Kynar® 720 (30/70) mixture.

The mixtures are prepared in a ZKS twin-screw-extruder at 240° C., are semi-crystalline and their melting temperature is substantially equal to that of pure PVDF (170° C.). The granules obtained are injected on a Mining press at 230° C., either in the form of 2 mm test specimens or in the form of bars with a thickness of 4 mm, the mechanical properties of which are measured:

♦ Stiffness

The elastic modulus E is measured in three-point bending, according to ISO Standard 178-93 at 23° C.

♦ Resistance to Large Deformations

The measurement is carried out on an ISO 1/2 test specimen (2 mm thickness) with an Instrom tensioning device at a rate of 25 mm/min and at a temperature of 23° C. according to ISO Standard R527. The deformation of the test specimen is monitored using a laser extensometer. Each test is carried out on at least five different test specimens. The following are measured for each of them:

| | |
|---|---|
| Elongation at yield point: | $\epsilon_y$ |
| Yield point stress: | $\sigma_y$ |
| Elongation at break: | $\epsilon_b$ |
| Stress at break: | $\sigma_b$ |

♦ Impact Strength

The measurement is carried out on an MGV ZWICK REL 1852 instrument-controlled Charpy impact device at 23° C., distance between supports 60 mm, at different speeds of impacters: 1 and 2 m·s⁻¹ The measurement is carried out on unnotched 4.4×9.7×80 mm bars. The quantity measured is the energy dissipated by the sample when it is broken, expressed in joules. When the impact does not cause the bar to break, the material is said to be non-brittle (NB).

By way of comparison, the same tests are carried out on samples of Kynar 720 (Control 1). All the results are combined in Table 1.

TABLE 1

| Test No. | E (MPa) | $\epsilon_y$ (%) | $\sigma_y$ (MPa) | $\epsilon_b$ (%) | $\sigma_b$ (MPa) | Impact E (1 m/s) | Impact E (2 m/s) |
|---|---|---|---|---|---|---|---|
| Control 1 | 1580 | 8.5 ± 0.5 | 48 ± 1 | 110 ± 10 | 37 ± 2 | 8.2 ± 0.5 | 6.5 ± 0.5 |
| Test 1 | 1460 | 10 ± 0.5 | 41 ± 1 | 280 ± 10 | 41 ± 2 | 3.6 ± 0.5 | x |
| Test 2 | 1460 | 11.5 ± 0.5 | 37 ± 1 | 260 ± 10 | 49 ± 2 | 3.7 ± 0.5 | x |
| Test 3 | 1400 | 11 ± 0.5 | 35.5 ± 1 | 235 ± 10 | 47 ± 2 | NB | 10.6 ± 0.5 |
| Test 4 | 1400 | 12 ± 0.5 | 31 ± 1 | 210 ± 10 | 45 ± 2 | NB | NB |

NB: The sample does not break

The influence of the temperature on the elongation at break eb of the composition of Test No. 4 and of PVDF alone are assessed. The results are combined in Table 2.

TABLE 2

| Test No. | $\epsilon_b$ at 20° C. (%) | $\epsilon_b$ at 0° C. (%) | $\epsilon_b$ at −10° C. (%) |
|---|---|---|---|
| Control 1 | 100 ± 10 | 22 ± 4 | 21 ± 5 |
| Test 4 | 200 ± 10 | 147 ± 5 | 68 ± 15 |

The influence of the ageing on the materials is assessed by annealing samples at 120° C. for 15 h. The elongation at break at 23° C. before and after annealing is measured. The results are combined in Table 3.

TABLE 3

| Test No. | $\epsilon_b$ before annealing (%) | $\epsilon_b$ after annealing (%) |
|---|---|---|
| Control 1 | 110 ± 10 | 65 ± 10 |
| Test 1 | 280 ± 10 | 85 ± 10 |
| Test 2 | 260 ± 10 | 110 ± 10 |
| Test 3 | 235 ± 10 | 250 ± 10 |
| Test 4 | 210 ± 10 | 230 ± 10 |

The specific volume ($V_{spec}$) of the materials 1 to 4 and of the control is measured at 230° C., on the one hand, and at 30° C., on the other hand, and the shrinkage in volume is calculated (specific volume at 230° C./specific volume at 30° C.*100). The results are combined in Table 4.

TABLE 4

| Test No. | $V_{spec}$ at 230° C. (cm³/g) | $V_{spec}$ at 30° C. (cm³/g) | Shrinkage (%) |
|---|---|---|---|
| Control 1 | 0.6764 | 0.5624 | 16.8 |
| Test 1 | 0.6963 | 0.5858 | 16.3 |
| Test 2 | 0.7085 | 0.597 | 15.7 |
| Test 3 | 0.7463 | 0.6394 | 14.3 |
| Test 4 | 0.7637 | 0.6576 | 13.9 |

♦ Stability of the Material (Non-exudation of the Triblock)

The variation in mass of lumps with a mass of 20 mg, withdrawn from the test specimens of Tests 1 to 4, after 1 h at 200° C. under air is determined using a Perkin Elmer TGA7 thermogravimetric balance; the variation is less than 1%.

By way of comparison, the variation in mass of a lump of test specimen with the same mass, composed of 90 parts by weight of Kynar 720 and of 10 parts by weight of butylbenzenesulphonamide, BBSA (plasticizer), is measured; its variation is equal to 10%.

Figure 2:
FIG. 2: Morphology of the material obtained in Example 2

♦ Examination of the Morphology of the Material (see FIG. 2)

Examination with a transmission microscope (TEM) at a magnification of 30,000 of a section of the composition of Test 1 (which has been subjected to an identical treatment to that described in Example 1 and which only contains 7 parts by weight of triblock) also shows a fine and even dispersion of PB nodules with a size of less than 0.02 μm within the PVDF+PMMA blocks matrix.

The size of the nodules $D_n$ is identical to that of the mixture, richer in the same triblock, of Example 1 (see FIG. 1).

The internodule distance $D_i$ is greater than that of Example 1 because the number of nodules per unit of volume is much lower.

The dark B domains surround, in a more or less continuous fashion, lighter microdomains composed of PS blocks; the size of which is between 0.05 and 0.07 μm. It is found that the dispersion of these multiphase PB and PS nodules within the matrix is very fine and very homogeneous. The corresponding photograph is presented in FIG. 2.

EXAMPLE 3

Figure 3:
FIG. 3: Morphology of the material obtained in Example 3

See FIG. 3

25 parts by weight of PMMA-PB-PS (50/15/35) ABC triblock of Example 1 and 65 parts by weight of Kynar® 720 and 5 parts by weight of a B-C diblock are mixed in a ZKS twin-screw extruder at 240° C.; this PB-PS (30/70) diblock is a by-product of the anionic polymerization of the ABC triblock and is composed of a PB block with an $M_n$ of 15,000 g.mol$^{-1}$ and of a PS block with an $M_n$ of 35,000. The mixture obtained is semi-crystalline and its melting temperature is substantially equal to that of pure PVDF (170° C.). The granules obtained are injected on a Mining press at 230° C., either in the form of 2 mm test specimens or in the form of bars with a thickness of 4 mm, the mechanical properties and the chemical behaviour of which are measured. The results obtained are substantially identical to those of the material of Test No. 4 of Example 2.

A section with a thickness of between 40 and 60 nm is cut from a sample of the material using an ultramicrotome. This section is exposed for 15 to 30 min to osmium tetroxide vapour and the section thus treated is subsequently observed with a transmission electron microscope at a magnification of 50,000. The photograph of the image observed is presented in FIG. 3: the dark-coloured nodules with a size of less than 0.02 μm are composed of B blocks which are incompatible with the light-coloured matrix composed of the PVDF+PMMA blocks mixture. Some of these B blocks are present in an external peripheral region of each nodule and surround, in a discontinuous fashion, the internal region of the nodule, which emerges in grey. Other B blocks are situated within this internal region. The reasonable hypothesis may be put forward that the latter nanodomains of B blocks originate from the poly(butadiene-b-styrene) B-C diblocks, by comparison with the morphology obtained in Example 1, where the triblock does not comprise B-C diblocks. This is because the B-C diblocks have more affinity for the C blocks of the internal region of the nodules than the A-B-C triblocks, which are drawn towards the matrix by the A blocks, which are compatible with the latter.

A dispersion of the nodules within the matrix is found which is fully as fine and homogeneous as for the compositions according to the invention not comprising B-C diblock.

EXAMPLE 4

A PMMA-PB-PS (58/11/31) ABC triblock for which the $M_n$ of the PMMA sequences is 58,000 g.mol$^{-1}$ that of the PB sequences is 11,000 and that of the PS blocks is 31,000 prepared according to the procedure disclosed in EP 524,054 or in EP 749,987.

This triblock is mixed with Kynar 720 and a C-B-C triblock, i.e. PS-PB-PS (15/70/15) with an $M_n$ of 100,000 g.mol$^{-1}$ under the operating conditions of Example 2.

The notched Charpy impact strength of the materials obtained is measured at 23, 0 and −10° C. with an impact speed of 1 m.s$^{-1}$ as indicated in Example 2.

The proportions by mass of the constituents (PVDF, A-B-C and C-B-C) of each of the materials tested and the results of impact strength tests at 23, at 0 and at −10° C. are combined in Table 5.

TABLE 5

| Test No. | mPVDF | mABC | mCBC | mCBC × 100 m(PVDF + ABC) | mB × 100 m(ABC + CBC) | Impact strength B means Broken NB means Non-Broken | | |
|---|---|---|---|---|---|---|---|---|
| | | | | | | 23° C. | 0° C. | −10° C. |
| Control 2 | 100 | 0 | 0 | 0 | 0 | B | B | B |
| Test 5 | 75 | 25 | 0 | 0 | 2.75 | NB | B | B |
| Test 6 | 75 | 18.75 | 6.25 | 6.7 | 6.2 | NB | NB | NB |
| Control 3 | 75 | 13.25 | 11.75 | 15 | 9 | NB | NB | B |
| Test 7 | 85 | 7 | 8 | 8.7 | 6.2 | NB | B | B |

EXAMPLE 5

25 parts by weight of the triblock of Example 2 are mixed in a Haake twin-screw extruder at 190° C. with 75 parts by weight of semi-crystalline PVC sold under the trade name GB 1150. Strips with a thickness of 4 mm and a width of 35 mm are extruded using a slot die placed at the extruder outlet, from which strips are cut out test specimens, in order to evaluate the softening temperature under stress (Vicat temperature) according to ISO Standard 306-94 on 5 samples, and to calculate the corresponding standard deviation, as well as the impact strength according to ISO Standard 179-93.

By way of comparison, the Vicat temperature and the impact strength of the PVC resin alone (Control 4) are measured under the same operating conditions. The results are combined in Table 6.

TABLE 6

| Test No. | $T_{vicat}$ under 50N (° C.) | Standard deviation (° C.) | Impact S at 23° C. (kJ/m²) |
|---|---|---|---|
| Control 4 | 79.9 | 0.4 | 4 |
| Test 8 | 86.1 | 0.5 | 5 |

COMPARATIVE EXAMPLE 6

Figure 4:
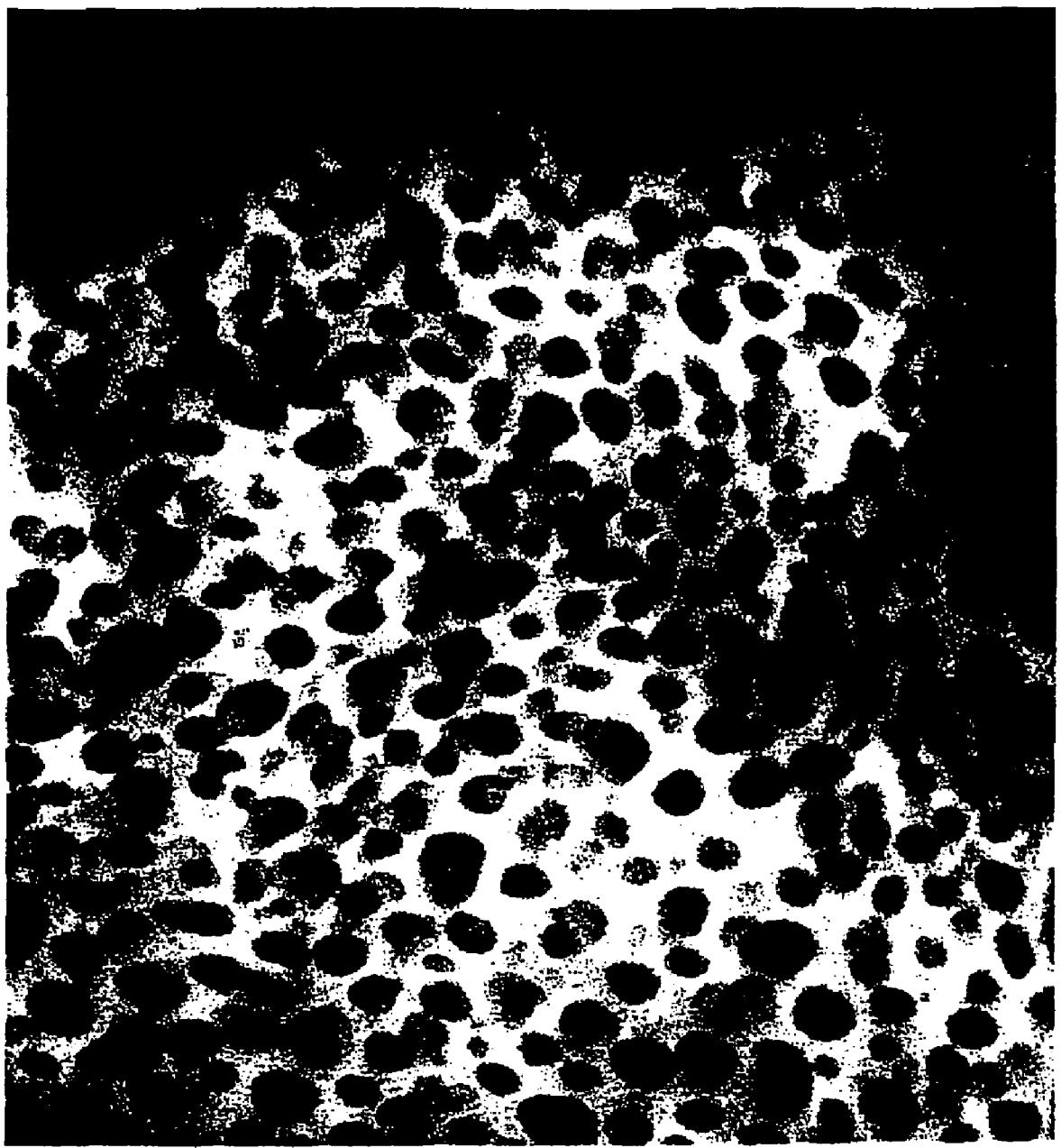
FIG. 4: Morphology of the material obtained in Comparative Example 6 (Test 2)
Figure 5:
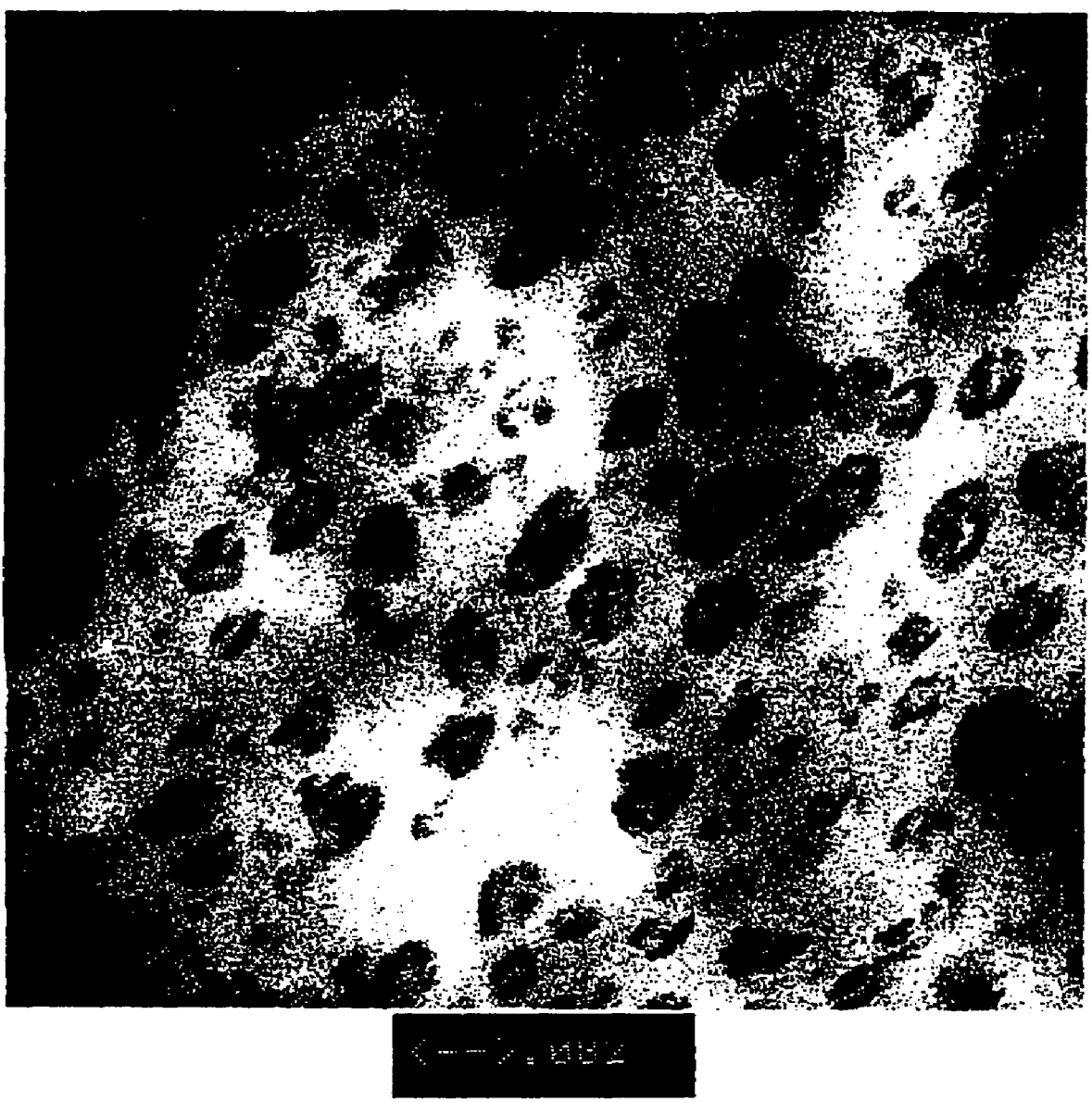
FIG. 5: Enlargement of FIG. 1
Figure 6:
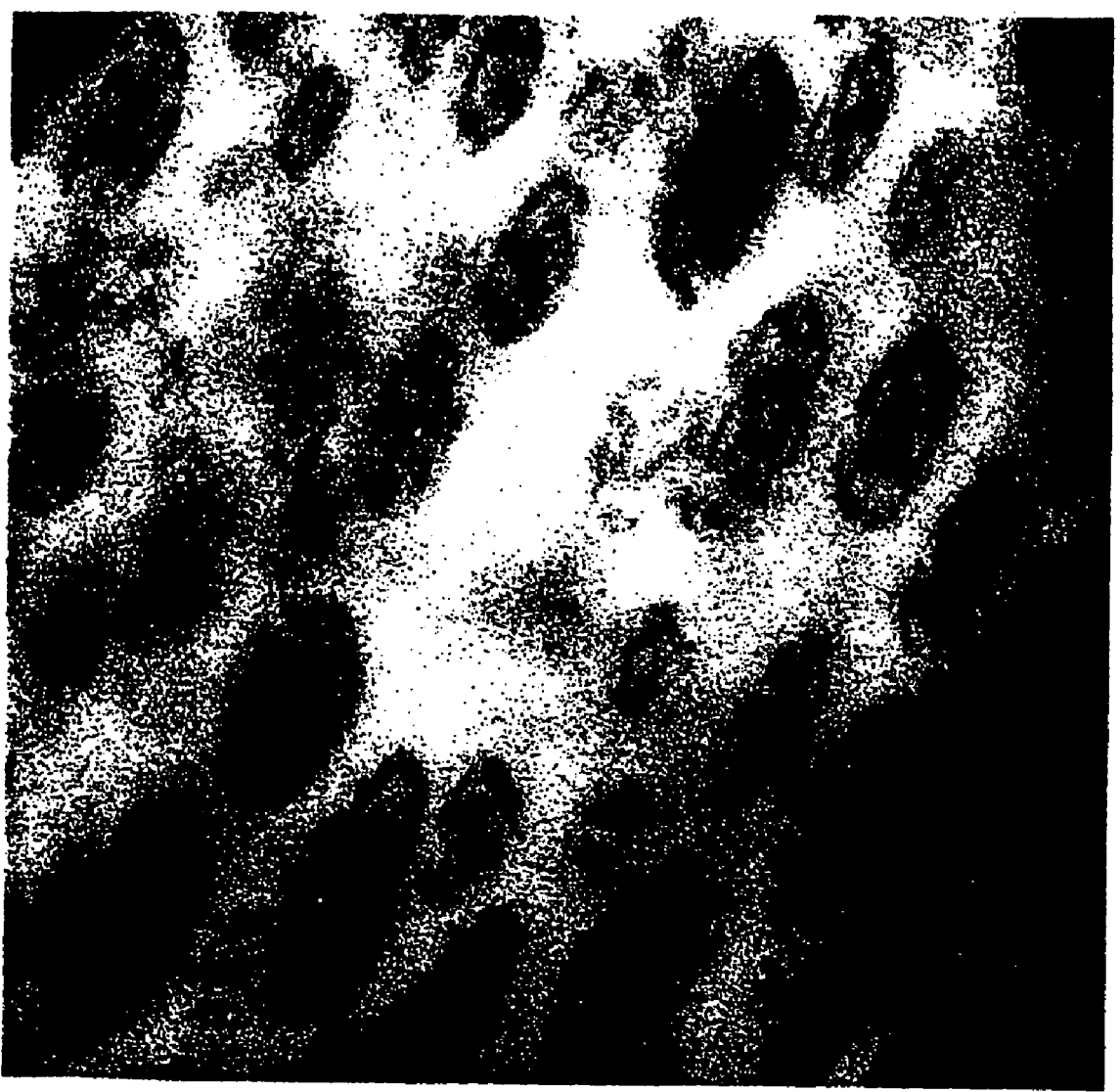
FIG. 6: Enlargement of FIG. 2

See FIG. 4

The following tests show the major disadvantage of the presence of a side-product homopolymer usual in the synthesis of a diblock.

The poly(butadiene)-poly(methyl methacrylate), PB-PMMA, diblock without significant presence of homopolymer is obtained by the same synthetic route as the PS-PB-PMMA triblock. It has an $M_n$ of 100,000 g.mol$^{-1}$, and is composed of 50% of PMMA and of 50% of PB by moles by number. The PB homopolymer was separated by a solid-liquid extraction with cyclohexane as solvent.

The material consisting of 70% of PVDF, of 25% of the PB-PMMA diblock and 5% of PB homopolymer is obtained in the same way as in the preceding examples.

The elongation at break of the materials which appear in Table 7 is measured with the following results:

TABLE 7

| Comparative Test No. | Compositions, % by weight | Elongation at break according to the ISO test |
|---|---|---|
| 1 | 100% PVDF | 50% |
| 2 | 75% PVDF + 25% PB-PMMA diblock | >200% |

TABLE 7-continued

| Comparative Test No. | Compositions, % by weight | Elongation at break according to the ISO test |
|---|---|---|
| 3 | 70% PVDF + 30% PB-PMMA diblock | >200% |
| 4 | 70% PVDF + 25% PB-PMMA diblock + 5% PB homopolymer | 10% |

Test No. 4 shows the loss in ductility caused by the presence of 5% of poly(butadiene).

The morphology of Test No. 2 appears in FIG. 4. Nodules uniformly filled with a black or dark colour are observed. This colour corresponds to the labelling of the poly(butadiene) blocks with osmium tetroxide.

These PB blocks thus constitute the interior of the nodules.

EXAMPLE 7

Figure 7:
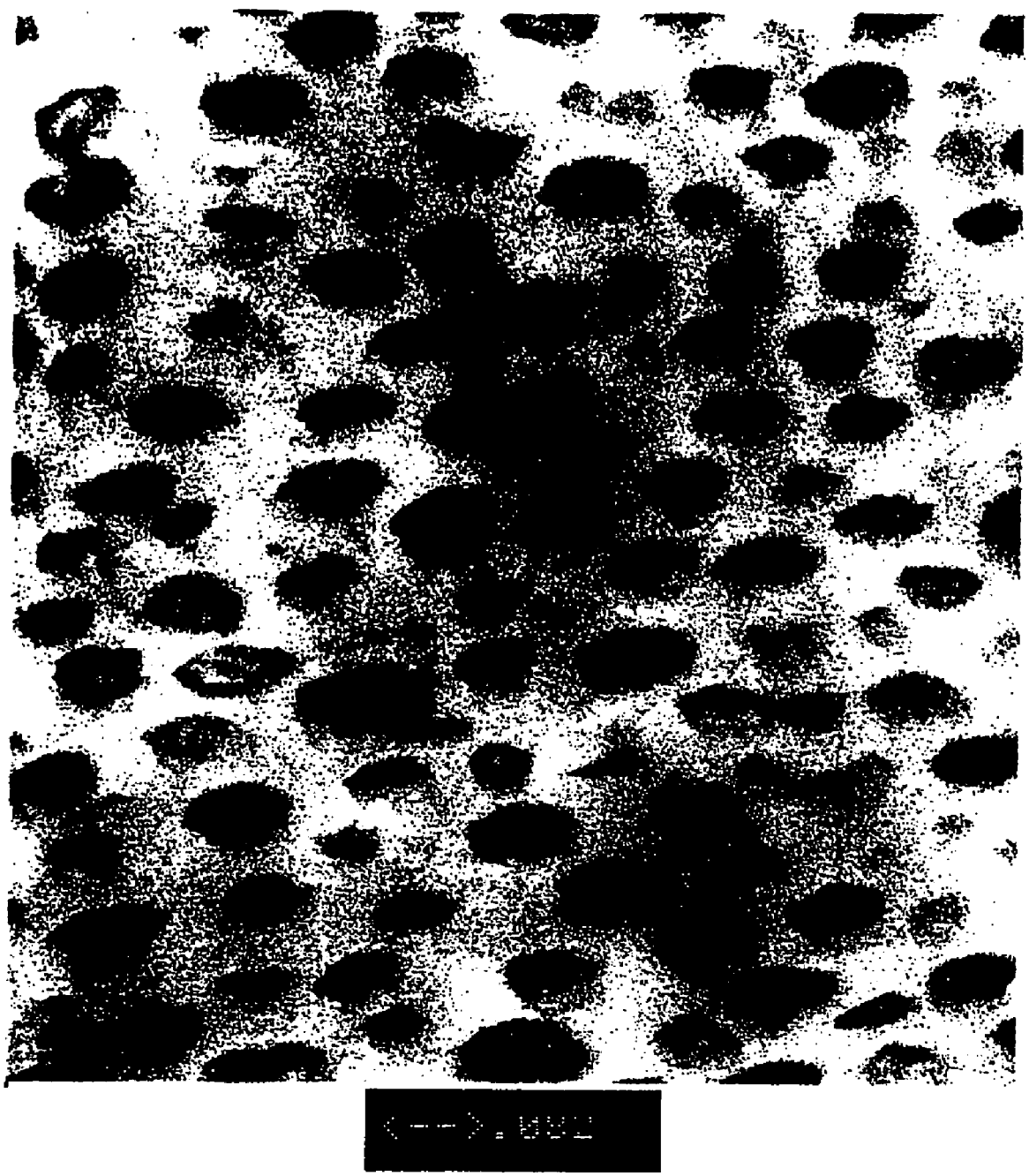
FIG. 7: Morphology of the material obtained in Example 7, Test 9 of Table 9
Figure 8:
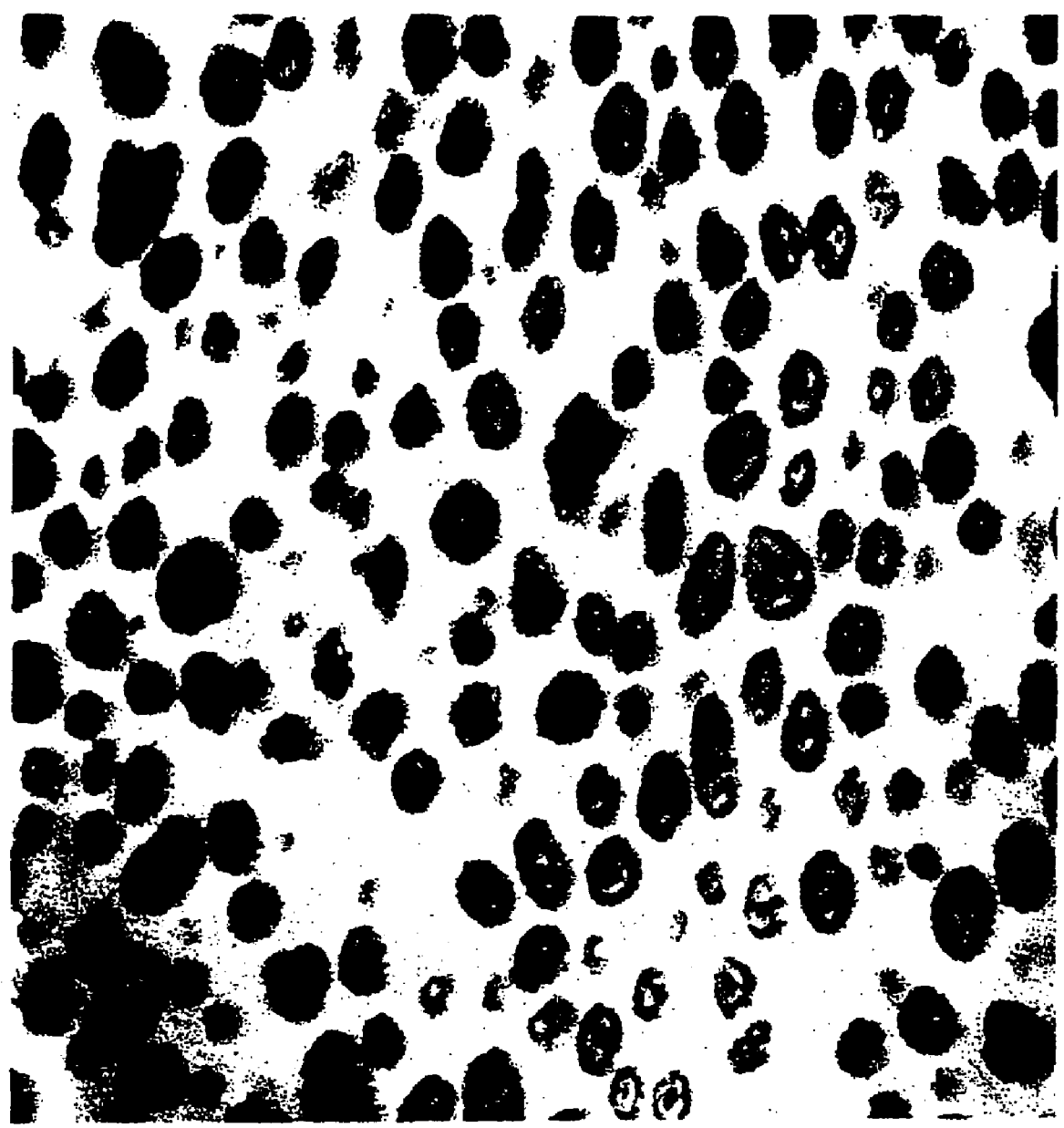
FIG. 8: Morphology of the material obtained in Example 7, Test 4 of Table 9

See FIGS. 7 and 8

Various PMMA-PB-PS triblocks were prepared according to, the procedure disclosed in EP 524,054 or EP 749,987. Their characteristics are listed in Table 8.

TABLE 8

| Product | % PMMA by weight | % PB by weight | % PS by weight | Total % by weight | $M_n$ | PI |
|---|---|---|---|---|---|---|
| ABC1 | 36 | 28 | 35 | 99 | 80,400 | 1.7 |
| ABC2 | 31 | 22 | 46 | 99 | 100,000 | 1.9 |
| ABC3 | 34 | 31 | 35 | 100 | 113,300 | 1.8 |
| ABC4 | 50 | 29 | 21 | 100 | 90,000 | 2.2 |
| ABC5 | 33 | 36 | 31 | 100 | 80,000 | 2.0 |

The molar mass $M_n$ of each triblock is measured by steric exclusion chromatography and the values are expressed in g.mol$^{-1}$ as polystyrene equivalent. The polydispersity index PI is defined by the ratio of the molecular mass by weight to the molecular mass by number, i.e. $M_w/M_n$.

The fractions by mass of PMMA, PB and PS are determined by NMR. These products comprise a B-C (PS-PB) diblock fraction and a C (PS) homopolymer fraction. B-C and C are synthetic intermediates and they never represent more than 25% of the final product.

In all cases, the glass transition temperature of the PB block is −90° C. The PMMA sequences are syndiotactic to more than 70%. The PMMA block has a Tg of 135° C.

Preparation Process

One of these five. ABC triblocks above is mixed in a ZKS twin-screw extruder at between 230° C. and 240° C. with a commercial PVDF from the company Elf Atochem. The compositions of the various mixtures prepared are given in Table 9 below.

The granules obtained are injected on a Mining press in the form of 80×10×4 mm bars, the mechanical properties of which are measured, in particular the impact strength by the notched. Charpy impact test at various temperatures according to ISO Standard 179/93-1eA.

TABLE 9

| Material | | Mean impact strength (kJ/m²) | | | | |
|---|---|---|---|---|---|---|
| | Composition | 23° C. | 0° C. | −10° C. | −20° C. | −30° C. |
| Control 1 | Kynar 740 | | 10.6B | 10B | 9.6B | 9B | 6.6B |
| Test 1 | Kynar 740/ABC1 | 90/10 | 31.5 | 15B | 15B | 12.6B | 11.6B |
| Test 2 | Kynar 740/ABC1 | 85/15 | 47 | 26 | 16B | 13.6B | 12.4B |
| Test 3 | Kynar 740/ABC1 | 80/20 | 55 | 55 | 52 | 22 | 16B |
| Test 4 | Kynar 740/ABC1 | 75/25 | 55 | 55 | 52 | 49 | 18B |
| Test 5 | Kynar 740/ABC2 | 85/15 | 32 | 15B | 15B | 14B | 12B |
| Test 6 | Kynar 740/ABC2 | 75/25 | 36 | 32 | 19 | 17B | 15B |
| Test 7 | Kynar 740/ABC3 | 85/15 | 51 | 18 | 15B | 14B | 11B |
| Test 8 | Kynar 740/ABC3 | 75/25 | 54 | 53 | 42 | 21 | 15B |
| Test 9 | Kynar 740/ABC4 | 80/20 | 45 | 45 | 40 | 17 | 13B |
| Test 10 | Kynar 740/ABC5 | 85/15 | 37 | 37 | 33 | 16 | 12B |
| Test 11 | Kynar 740/ABC5 | 80/20 | 37 | 35 | 33 | 23 | 12B |
| Test 12 | Kynar 740/ABC5 | 75/25 | 39 | 38 | 37 | 32 | 22 |
| Control 2 | Kynar 400 | | 30 | 17 | 15B | 15B | 12B |
| Test 13 | Kynar 400/ABC1 | 80/20 | 98 | 95 | 85 | 80 | 60 |

The values indicated with a "B" correspond to the samples which exhibit brittle failure. The other samples exhibit ductile failure.

Comparison of Tests 1 to 13 with Control 1:

it is not able that strengthening with regard to impacts is obtained with all the ABC triblocks tested.

Comparison of Tests 1, 2, 3 and 4, comparison of Tests 5 and 6, comparison of Tests 7 and 8 and comparison of Tests 10, 11 and 12:

It is observed that the improvement increases as the level of triblock increases in the range 10 to 25%. This is reflected by a shift towards low temperature. This property is essential in numerous applications.

Modulus/impact compromise:

The improvement in the impact is usually made at the expense of the modulus.

It is noteworthy that this improvement in the impact properties of the PVDF is obtained, on the one hand, without significant lowering (<10%) of the flexural modulus of the PVDF and, on the other hand, without lowering of the melting temperature of the material (<3° C.).

It should be noted that for the first time to the knowledge of the Applicant Company, a material composed of more than 80% of PVDF (Test 13), having a modulus substantially equal to PVDF and a melting temperature substantially equal to PVDF, exhibits ductile behaviour in a notched Charpy impact test at −30° C.

Morphology:

All these materials have a specific morphology.

FIG. 8 corresponds to Test 4. It is found that, in the nodules, PB blocks appear visualized within an internal region predominantly composed of C blocks and surrounded by a continuous external peripheral region forming a kind of black ring comprising the PB blocks of the triblocks. Examination of the morphologies between this example and Example 1, in which the triblock comprises no diblock, makes it possible to maintain that the PB blocks situated within the nodules can be attributed to the PS-PB diblocks.

FIG. 7 corresponds to Test 9. It shows a morphology analogous to that of Test 4 at a greater magnification.

The evenness of the domains can be detrimentally affected to a slight extent during the conversion (effect of the shearing).

Comment on the conversion (ease of producing these materials):

It has been found, in an entirely surprising way, that the properties of the materials obtained are not dependent on the state in which the products are provided before mixing.

Thus, by mixing PVDF granules and a triblock powder, the same results are obtained as =by mixing a PVDF powder and a triblock powder or a PVDF powder and triblock granules or PVDF granules and triblock granules.

EXAMPLE 8

An ABC triblock is mixed in a ZKS twin-screw extruder at between 230° C. and 240° C. with a commercial PVDF from the company Elf Atochem. The compositions of the various mixtures prepared are given in Table 8.

Figure 11:
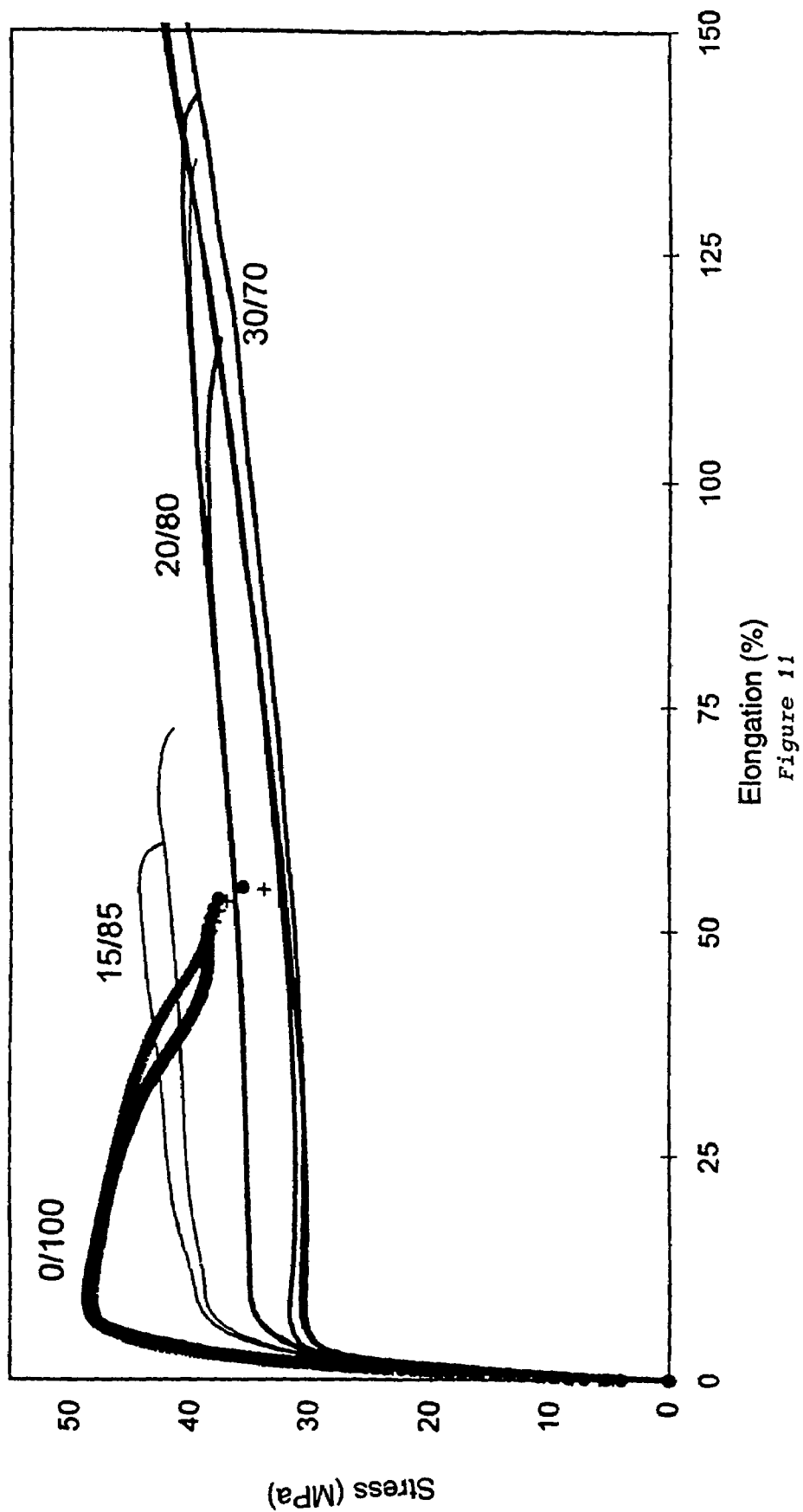
FIG. 11: Curve of elongation of the materials in Example 8

The granules obtained are injected on a Mining press in the form of ISO 1/2 test specimens (thickness of 2 mm), the tensile behaviour of which is measured. The deformation of the test specimen is monitored using a laser extensometer, the tensioning rate is 25 mm/min and the temperature is controlled at 23° C. The curves of stress as a function of elongation are represented in FIG. 11 and the main results are taken up in Table 10.

TABLE 20

| Material | | Tensile behaviour | |
|---|---|---|---|
| | Composition | $\epsilon_b$ (%) | Comment |
| Control 1 | Kynar 740 | | 60 | Very marked necking |
| Test 1 | Kynar 740/ABC4 | 85/15 | 70 | Very slight necking |
| Test 2 | Kynar 740/ABC4 | 80/20 | 130 | No necking, no detectable yield point, homogeneous deformation |
| Test 3 | Kynar 740/ABC4 | 70/30 | 200 | No necking, yield point scarcely detectable, homogeneous deformation |

Comment:

The addition of ABC triblock to the PVDF completely alters its tensile behaviour. A material which does not neck and which deforms homogeneously is obtained. This property is essential in numerous applications where the appearance of damage (necking) beyond 10% elongation is harmful.

It is surprising that this alteration in the tensile behaviour is obtained without significant decrease in the modulus of the material.

Preparation of films:

Films were processed on a microextruder of Randcastle RCP0500 trade mark starting with ABC+PVDF granules. The temperature profile was set at 210° C. in the first two heating regions and at 185° C. at the die. Films for which the thickness could be controlled between 10 µm and 400 µm were obtained.

Tensile tests were carried out on these films. The PVDF film (Kynar 740) necks, whereas the films obtained by mixing Kynar 740 with 15% of ABC1 and the films obtained by mixing Kynar 740 with 15% of ABC4 do not exhibit necking and deform homogeneously. This property is important in applications in films or in bubble form in extrusion blow-moulding.

It also makes it possible to prepare products for preparing coextrusion binders.

Measurements of Permeability to Fuels and to Solvents

Measurements of permeability to fuels, to methanol and, to toluene were carried out starting with the films prepared above. It was found that the ABC+PVDF materials retain excellent barrier properties.

The combination of these excellent barrier properties, of the specific tensile behaviour (absence of necking) and of the excellent impact properties make ABC+PVDF materials perfectly suited to the preparation of (mono- or multilayer) pipes or of extruded or moulded components used for the transportation or storage of petrols, organic solvents or aggressive fluids.

EXAMPLE 9

PVC+PMMA-PB-PS Triblock

The addition of ABC triblock to PVC facilitates the conversion of the latter. This can be demonstrated by measuring the time necessary to obtain a homogeneous molten sheet on a counter-rotating twin-roll calender (known as melting time). Furthermore, the addition of ABC triblock results in a material for which the impact properties (measured according to ISO Standard 179/93-1EA) and the Vicat point (measured according to ISO Standard 306/94-B50) are improved. This result is entirely surprising because:

conventional impact additives for PVC, such as core-shells (MBS) and acrylic core-shells result in a decrease in the Vicat point, conventional "heat" additives for PVC make it possible to improve the Vicat point but result in a lessening of the impact properties.

Another surprising point is that the improvement in all these properties is not made at the expense of the transparency of the material.

Various PMMA-PB-PS triblocks were prepared according to the procedure disclosed in EP 524,054 or in EP 749,987. Their characteristics are listed in Table 11.

TABLE 11

| Product | % PMMA by weight | % PB by weight | % PS by weight | $M_n$ | PI |
|---------|------------------|----------------|----------------|-------|-----|
| ABC1 | 36 | 28 | 35 | 80,400 | 1.7 |
| ABC4 | 50 | 29 | 21 | 90,000 | 2.2 |

Effect on the Conversion

Several grades of commercial PVC from Elf Atochem were used, the K value of which varies between 57 and 70. These products were preformulated with 2 parts of heat stabilizer, 1.9 parts of external lubricants and 1.5 parts of processing aid. Various dry mixings were carried out with the same composition by mass of 75% of preformulated PVC and of 25% of ABC triblock.

One of its PVC grades (K value of 67) was formulated with only 0.6 part of lubricant and 2 parts of heat stabilizer (without processing aid), which is Control No. 4. Two mixtures were prepared with 15% and with 25% of ABC triblock. The results obtained are given in Table 12.

TABLE 12

| Reference | Product | Temperature of the rolls (° C.) | Sheeting time (min) |
|-----------|---------|---------------------------------|---------------------|
| Control 1 | PVC, K value of 57 | 190 | 12 |
| Test 1 | Control 1/ABC1 75/25 | 190 | 5 |
| Test 2 | Control 1/ABC4 75/25 | 190 | 9 |
| Control 2 | PVC, K value of 67 | 200 | 29 |
| Test 3 | Control 2/ABC1 75/25 | 200 | 4 |
| Test 4 | Control 2/ABC4 75/25 | 200 | 12 |
| Control 3 | PVC, K value of 70 | 215 | 7 |
| Test 5 | Control 3/ABC1 75/25 | 215 | 4 |
| Test 6 | Control 3/ABC4 75/25 | 215 | 6 |
| Control 4 | PVC, K value of 67 | 190 | >30 |
| Test 7 | Control 4/ABC4 85/15 | 190 | 6 |
| Test 8 | Control 4/ABC4 75/25 | 190 | 5 |

Comments

It is found that the addition of triblock significantly reduces the sheeting time of the product. This constitutes a major advantage of the formulation according to the invention. Other products have the same effect but, to our knowledge, none exhibits the combination of properties of these formulations (processing, Vicat, impact).

The addition of ABC triblock to Control No. 4 makes it possible to convert this product at 190° C., whereas it cannot be converted alone at this temperature.

Joint Improvement in the Impact Properties and in the Vicat Point

Various sheets of PVC+ABC mixtures are prepared on a twin-roll calender with the same procedure as described above. The sheets obtained are press-moulded in the form of plates with a thickness of 4 mm at 195° C. for 8 min.

88×10×4 mm bars are cut out from these plates in order to carry out notched Charpy impact measurements at 23° C. according to ISO Standard 179/93-1EA. The Vicat point measurements are carried out on these plates according to ISO Standard 306/94-B50. The results obtained are given in Table 13.

TABLE 13

| Reference | Product | Impact strength at 23° C. (kJ/m$^2$) | Vicat temperature, 50N (° C.) |
|-----------|---------|--------------------------------------|-------------------------------|
| Control 2 | Pvc, K value of 57 | 5.5 B | 79.5 |
| Test 9 | Control 2/ABC4 85/15 | 20 | 81.4 |
| Test 10 | Control 2/ABC4 80/20 | 30 | 82.3 |
| Test 6 | Control 2/ABC4 75/25 | 64 | 82.9 |
| Test 11 | Control 2/ABC4 60/40 | 25 | 83.6 |

The values indicated with a "B" correspond to the samples which exhibit brittle failure. The other samples exhibit ductile failure.

Structure

All these materials have a specific structure as described below.

Figure 9:
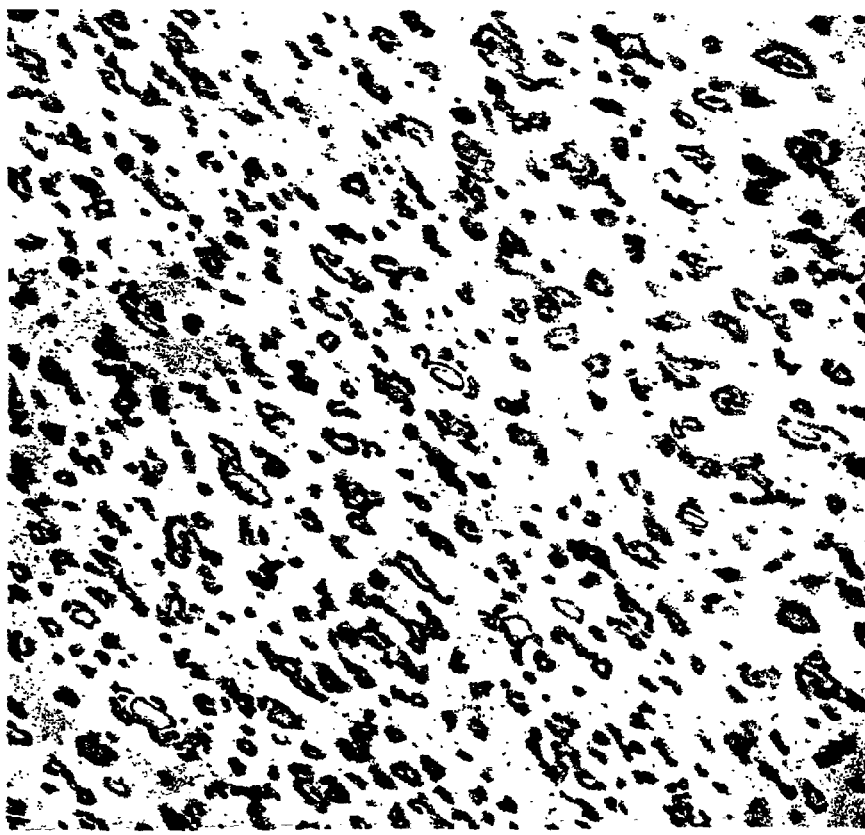
FIG. 9: Morphology of the material obtained in Example 9, Test 6 of Table 12

A transmission electron microscopy exposure carried out on a sample withdrawn from a bar corresponding to Test 6 is appended (FIG. 9).

We again demonstrate that the structure is an intrinsic characteristic of the materials according to the present invention.

The evenness of the domains can be detrimentally affected to a slight extent during the conversion (effect of the shearing).

Figure 10:
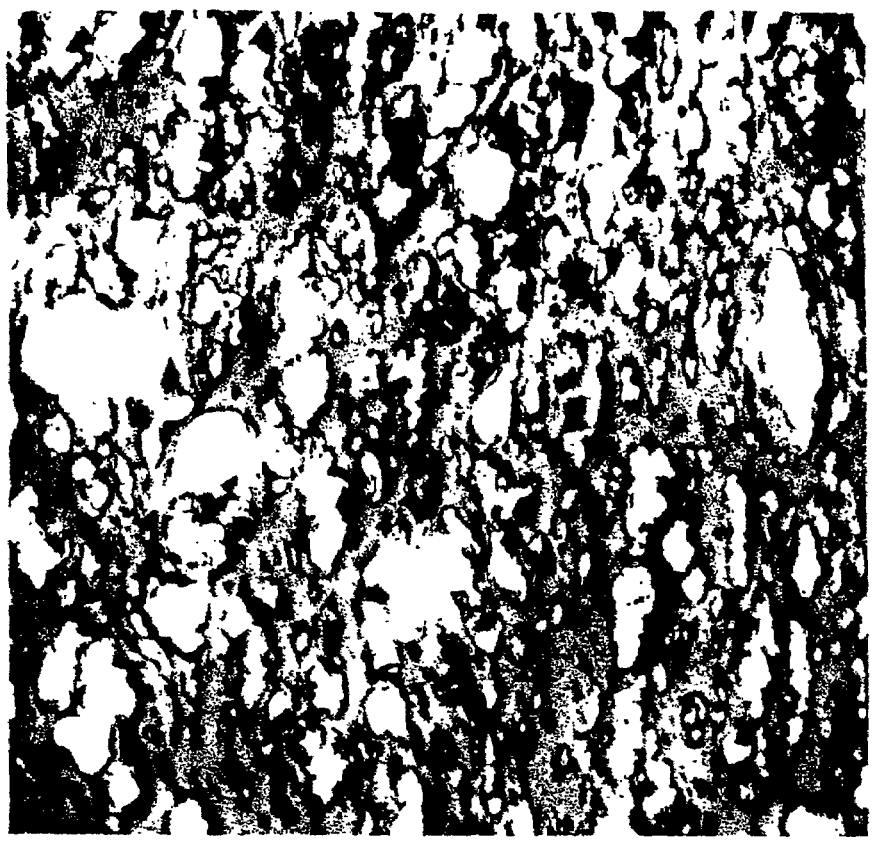
FIG. 10: Morphology of the material obtained in Example 9, Test 6 of Table 12 after damaging by impact

A transmission electron microscopy exposure was carried out on a damaged bar (recovered after the notched Charpy impact test). The region observed corresponds to the region where the material has deformed in a ductile way (FIG. 10). It is found on this exposure that, surprisingly, the deformation is extremely homogeneous. Extremely numerous microholes have been created within the domains constituted by the B and C blocks of the ABC triblock. The creation of these holes is a key factor in dissipating energy and thus strengthening the material with respect to impact.

EXAMPLE 10

Chlorinated poly(vinyl chloride) (CPVC)+PS-PB-PMMA Triblock

The addition of ABC triblock to CPVC facilitates the conversion of the latter. This can be demonstrated by measuring the time necessary to obtain a homogeneous molten sheet on a counter-rotating twin-roll calender (known as melting time). Furthermore, the addition of ABC triblock results in a material with improved impact properties (measured according to ISO Standard 179/93-1EA). According to the content of chlorine in the CPVC, this improvement in impact properties takes place in conjunction with an increase or a decrease in the Vicat point (measured according to ISO Standard 306/94-B50).

Another surprising point is that the triblocks make it possible to obtain values of impact strength which are unequalled, to the knowledge of the Applicant Company.

Another surprising point is that the improvement in all these properties does not take place at the expense of the transparency of the material.

Several grades of CPVC were used, the K value of which varies between 57 and 67 and the chlorine content of which varies between 62% and 69%. These products were preformulated with 2 parts by weight of heat stabilizer, 1.9 parts of external lubricants and 1.5 parts of processing aid. Various dry mixings were carried out with 15% of ABC triblock. The results obtained are given in Table 14.

TABLE 14

| Reference | Product | Temperature of the rolls (° C.) | Sheeting time (min) |
| --- | --- | --- | --- |
| Control 1 | CPVC, K value of 57, 65% Cl | 200 | 17 |
| Test 1 | Control 1/ABC1 85/15 | 200 | 6 |
| Test 2 | Control 1/ABC4 85/15 | 200 | 6 |
| Test 3 | Control 1/ABC6 85/15 | 200 | 7 |
| Control 2 | CPVC, K value of 67, 65% Cl | 215 | 20 |
| Test 4 | Control 2/ABC1 85/15 | 215 | 3 |
| Test 5 | Control 2/ABC4 85/15 | 215 | 5 |
| Test 6 | Control 2/ABC6 85/15 | 215 | 8 |

Various sheets of CPVC+ABC mixtures are prepared on a twin-roll calender with the same procedure as described above. The sheets obtained are press-moulded in the form of plates with a thickness of 4 mm at 1950° C. for 8 min.

80×10×4 mm bars are cut out from these plates in order to carry out notched Charpy impact measurements at 23° C. according to ISO Standard 179/93-1EA. The Vicat point measurements are carried out on these plates according to ISO Standard 306/94-B50. The results obtained are given in Table 15;

TABLE 15

| Reference | Product | Impact strength at 23° C. (kJ/m$^2$) | Vicat temperature, 50N (° C.) |
| --- | --- | --- | --- |
| Control 1 | CPVC, K value of 57, 65% Cl | 2.7 B | 102.9 |
| Test 7 | Control 1/ABC1 75/25 | 48.5 | 102 |
| Test 8 | Control 1/ABC6 75/25 | 8.7 | 104.2 |
| Control 2 | CPVC, K value of 67, 65% Cl | 3.1 B | 106.4 |
| Test 4 | Control 2/ABC1 85/15 | 9.3 | 103.4 |
| Test 5 | Control 2/ABC4 85/15 | 17.5 | 104.6 |
| Control 3 | CPVC, K value of 57, 62% Cl | 3.2 B | 90.3 |
| Test 9 | Control 3/ABC1 75/25 | 63.3 | 91.3 |
| Test 10 | Control 3/ABC6 75/25 | 8.5 | 94.4 |
| Control 4 | CPVC, K value of 57, 67% Cl | 1.9 B | 113.3 |
| Test 11 | Control 4/ABC1 75/25 | 23.6 | 107.1 |
| Test 12 | Control 4/ABC6 75/25 | 15.3 | 111.5 |
| Control 5 | CPVC, K value of 57, 69% Cl | 1.8 B | 124.5 |
| Test 13 | Control 5/ABC1 75/25 | 13.3 | 113.6 |
| Test 14 | Control 5/ABC6 75/25 | 10.4 | 117.6 |

The values indicated with a "B" correspond to the samples which exhibit brittle failure. The other samples exhibit ductile failure.

CONCLUSIONS

The ABC triblocks, added to CPVCs with a chlorine content of less than 65%, make it possible to obtain a material which can be more easily converted, with a higher Vicat point and with exceptional impact properties.

The ABC triblocks, added to the CPVCs with a chlorine content of greater than 65%, make it possible to obtain a material which can be more easily converted and with excellent impact properties.

The invention claimed is:

1. A composition consisting essentially of:
   a thermoplastic fluorinated resin X1 or several compatible thermoplastic resins X1 to Xn, wherein at least one of X1 to Xn is fluorinated, and
   at least one block (sequential) copolymer,
   n being an integer equal to or greater than 1, wherein:
   the block copolymer comprises at least three blocks A, B, and C, wherein each block is either a homopolymer or a copolymer obtained from two or more monomers, the A block is connected to the B block and the B block is connected to the C block by means of a covalent bond or of an intermediate molecule connected to one of these blocks via a covalent bond and to another block via another covalent bond,
   the A block is compatible with the thermoplastic resin or resins X1 to Xn,
   the B block is incompatible with the thermoplastic resin or resins X1 to Xn and incompatible with the A block,
   the C block is incompatible with the thermoplastic resin or resins X1 to Xn, the A block and the B block;
   said composition comprising, by weight, at least 50% of the thermoplastic fluorinated resin(s), based on the total weight of fluorinated resin(s) and the block copolymer being at least one block copolymer with a number-average molecular mass (Mn) of greater than or equal to 20,000 g.mol−1 composed of:
  20 to 93 parts by weight of A sequences,
  5 to 50 parts by weight of B sequences, and
  2 to 50 parts by weight of C sequences; and wherein said thermoplastic fluorinated resin(s) comprises poly(vinylidene difluoride) (PVDF) and said block copolymer is a poly(methyl methacrylate)-poly(butadiene)-poly(styrene) triblock copolymer.

* * * * *